US011265656B2

(12) United States Patent
Higgins et al.

(10) Patent No.: US 11,265,656 B2
(45) Date of Patent: Mar. 1, 2022

(54) PAIRING SYSTEM AND METHOD FOR EAR-WORN DEVICES

(71) Applicant: Starkey Laboratories, Inc., Eden Prairie, MN (US)

(72) Inventors: Sidney A. Higgins, Maple Grove, MN (US); David Alan Fabry, Eden Prairie, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 0 days.

(21) Appl. No.: 16/709,343

(22) Filed: Dec. 10, 2019

(65) Prior Publication Data

US 2021/0176564 A1 Jun. 10, 2021

(51) Int. Cl.
*H04R 5/04* (2006.01)
*H04W 76/10* (2018.01)
*G06F 3/01* (2006.01)
*H04R 1/02* (2006.01)
*H04R 1/10* (2006.01)
*H04R 5/033* (2006.01)

(52) U.S. Cl.
CPC ............... *H04R 5/04* (2013.01); *G06F 3/017* (2013.01); *H04R 1/028* (2013.01); *H04R 1/1008* (2013.01); *H04R 1/1025* (2013.01); *H04R 5/033* (2013.01); *H04W 76/10* (2018.02); *H04R 2420/07* (2013.01)

(58) Field of Classification Search
CPC ........ H04R 5/04; H04R 1/028; H04R 1/1008; H04R 1/1025; H04R 5/033; H04R 2420/07; H04W 76/10; G06F 3/017

USPC ....... 381/309, 311, 58, 314, 315, 74, 79, 81, 381/82, 123, 361, 365, 380, 394; 455/41.2, 41.1, 575.2, 573
See application file for complete search history.

(56) References Cited

U.S. PATENT DOCUMENTS

| 9,450,682 | B2 | 9/2016 | Herman et al. |
| 9,949,124 | B1* | 4/2018 | Chen ...................... G06F 3/017 |
| 2006/0274747 | A1 | 12/2006 | Duchscher et al. |
| 2010/0223996 | A1* | 9/2010 | Fukumoto ............. G01P 15/123 |
| | | | 73/504.12 |
| 2015/0089593 | A1 | 3/2015 | Herman et al. |
| 2015/0341973 | A1 | 11/2015 | El-hoiydi et al. |

(Continued)

FOREIGN PATENT DOCUMENTS

| CN | 105303790 | 2/2016 |
| CN | 108848429 | 11/2018 |

(Continued)

OTHER PUBLICATIONS

"Livio AI Standard Quick Start Guide," Starkey Hearing Technologies User Guide, 2018 (13 pages).

(Continued)

*Primary Examiner* — Norman Yu
(74) *Attorney, Agent, or Firm* — Pauly, DeVries, Smith & Deffner LLC

(57) ABSTRACT

A hearing assistance system and method are described herein. The system includes a first ear-worn device, a second ear-worn device, and a case. The system is configured to detect a vibration sequence at an IMU and decide whether to pair wireless communication devices of the first and second ear-worn devices based on the vibration sequence detected at the IMU.

20 Claims, 13 Drawing Sheets

(56) References Cited

U.S. PATENT DOCUMENTS

| | | | |
|---|---|---|---|
| 2016/0065301 A1* | 3/2016 | Kukulski | H04W 12/003 |
| | | | 455/41.2 |
| 2016/0241063 A1* | 8/2016 | Hatanaka | H02J 7/025 |
| 2017/0093079 A1* | 3/2017 | Wagman | H02J 50/10 |
| 2018/0045967 A1* | 2/2018 | Osterhout | G06F 3/03545 |
| 2018/0091884 A1* | 3/2018 | Minoo | H02J 7/0042 |
| 2018/0132287 A1 | 5/2018 | Cheng et al. | |
| 2019/0150204 A1* | 5/2019 | Hintermeister | H04W 76/14 |
| | | | 455/411 |
| 2019/0268703 A1 | 8/2019 | Solum et al. | |

FOREIGN PATENT DOCUMENTS

| | | |
|---|---|---|
| CN | 109714744 | 5/2019 |
| EP | 3151584 | 4/2017 |
| WO | 2021118784 | 6/2021 |

OTHER PUBLICATIONS

"MuseiQ Wireless hearing solutions made for life," Starkey Hearing Technologies Consumer Brochure, 2018 (13 pages).

"Rechargeable RIC (Receiver-in-Canal) Standard Products," Rechargeable Operations Manual, Starkey Hearing Technologies 2018 (23 pages).

"RIC (Receiver-In-Canal) Standard Products," Smartphone Compatible and Universal Connectivity Operations Manual, Starkey Hearing Technologies 2018 (21 pages).

"International Search Report and Written Opinion," for PCT Application No. PCT/US2020/061333 dated Feb. 26, 2021 (26 Pages).

* cited by examiner

PAIRING SYSTEM AND METHOD FOR EAR-WORN DEVICES

FIELD

Embodiments herein relate to pairing of ear-worn devices, such as hearing aids, for radio frequency communication.

BACKGROUND

Many ear-worn devices, including hearing aids, have the ability to be paired with another device for wireless communication, such as radio frequency communication. For example, a first ear-worn device can be paired with a second ear-worn device as a binaural counterpart. One or more ear-worn devices can be paired with a smart phone or other accessory device. During the pairing process, the devices exchange identification and authentication data. Current pairing methods can be cumbersome, especially where multiple ear-worn devices are paired with a smart phone or other accessory. Some current pairing methods for ear-worn devices rely on the presence of and user interface of a smart phone or computer to accomplish the pairing. These methods leave the user without any option to re-establish pairing if the ear-worn devices become unpaired while the user is away from a smart phone or computer. In that scenario, the user will be without hearing assistance until they again have access to a smart phone or computer.

SUMMARY

In a first aspect, a hearing assistance system is included having a first ear-worn device and a second ear-worn device, wherein each of the ear-worn devices includes: a speaker, a microphone, a processor, a non-transitory computer memory, a rechargeable battery, a charging contact, and a wireless communication device. The hearing assistance system also includes a case having a case battery, a case inertial measurement unit (IMU), a first case charging contact and a second case charging contact, a case processor, and a case non-transitory computer memory. The first ear-worn device is configured to be positioned within the case so that the charging contact of the first ear-worn device is in electrical communication with the first case charging contact within the case. The second ear-worn device is configured to be positioned within the case so that the charging contact of the second ear-worn device is in electrical communication with the second case charging contact within the case. One or more of the memories in the first ear-worn device, second ear-worn device, or case stores computer instructions for instructing one or more of the processors in the first ear-worn device, second ear-worn device, or case to perform: detecting a vibration sequence at the case IMU, and deciding whether to pair the wireless communication devices of the first and second ear-worn devices based on the vibration sequence detected at the case IMU.

In a second aspect, in addition to one or more of the preceding or following aspects, or in the alternative to some aspects, the memory of the case stores instructions to input the vibration sequence detected at the case IMU to the processor of the first ear-worn device and to the processor of the second ear-worn device. The memory of each of the ear-worn devices stores instructions to: compare the vibration sequence detected at the case IMU to an expected vibration sequence, and if the vibration sequence detected at the case IMU sufficiently matches the expected vibration sequence, pairing the wireless communication device of the first ear-worn device to the wireless communication device of the second ear-worn device.

In a third aspect, in addition to one or more of the preceding or following aspects, or in the alternative to some aspects, the memory of each of the ear-worn devices stores instructions to receive the vibration sequence detected at the case IMU via the charging contact.

In a fourth aspect, in addition to one or more of the preceding or following aspects, or in the alternative to some aspects, the memory of the case stores instructions to accept a user input vibration sequence to define the expected vibration sequence and communicate the expected vibration sequence to the memory of the ear-worn devices.

In a fifth aspect, in addition to one or more of the preceding or following aspects, or in the alternative to some aspects, one or more of the memories in the first ear-worn device, second ear-worn device, or case stores computer instructions for instructing one or more of the processors in the first ear-worn device, second ear-worn device, or case to perform: pairing the first and second ear-worn devices; after pairing the first and second ear-worn devices, lighting a positive indicator light on the case to indicate to a user that the first and second ear-worn devices are paired; and if the vibration sequence detected at the case IMU does not sufficiently match the expected vibration sequence, lighting a negative indicator light on the case to indicate to the user that the first and second ear-worn devices are not paired.

In a sixth aspect, in addition to one or more of the preceding or following aspects, or in the alternative to some aspects, the memory in the first ear-worn device and the memory in the second ear-worn device store computer instructions to perform: while the ear-worn devices are positioned in the case, the ear-worn devices detecting an open/close sequence. The open/close sequence includes making an electrical connection in response to closing the case and unmaking an electrical connection in response to opening the case. In response to detecting the open/close sequence, the first and second ear-worn devices enter a pairing mode.

In a seventh aspect, in addition to one or more of the preceding or following aspects, or in the alternative to some aspects, the open/close sequence is detected at the charging contact of the first ear-worn device and the charging contact of the second ear-worn device.

In an eighth aspect, in addition to one or more of the preceding or following aspects, or in the alternative to some aspects, the open/close sequence includes opening and closing the case three times.

In a ninth aspect, in addition to one or more of the preceding or following aspects, or in the alternative to some aspects, the hearing assistance system can include a smart phone having an IMU, a processor, a non-transitory computer memory, a user input device, a wireless communication device, and a display device. The memory of the smart phone stores computer instructions for instructing the processor in the smart phone to perform: placing the smart phone into a pairing mode; at a same time as the vibration sequence is detected at the case IMU, detecting the vibration sequence by the smart phone IMU; and based on the vibration sequence detected by the smart phone IMU, deciding whether to pair the wireless communication device of the smart phone with the wireless communication devices of the first and second ear-worn devices.

In a tenth aspect, in addition to one or more of the preceding or following aspects, or in the alternative to some aspects, the memory of the smart phone stores computer instructions for instructing the processor in the smart phone to perform: inputting the vibration sequence detected at the smart phone IMU to the processor of the smart phone; comparing the vibration sequence detected at the smart phone IMU to an expected vibration sequence; and if the vibration sequence detected at the smart phone IMU sufficiently matches the expected vibration sequence, pairing the wireless communication device of the smart phone with the wireless communication devices of the first and second ear-worn devices.

In an eleventh aspect, in addition to one or more of the preceding or following aspects, or in the alternative to some aspects, the memory of the smart phone stores computer instructions for instructing the processor in the smart phone to perform: if the vibration sequence detected at the smart phone IMU does not sufficiently match the expected vibration sequence, presenting a message to a user on a display device of the smart phone indicating that the smart phone has not been paired to the first and second ear-worn devices.

In a twelfth aspect, in addition to one or more of the preceding or following aspects, or in the alternative to some aspects, the vibration sequence detected at the smart phone IMU is generated while the smart phone is located on a hard surface along with the case.

In a thirteenth aspect, in addition to one or more of the preceding or following aspects, or in the alternative to some aspects, the case IMU is configured to detect a vibration sequence generated by: placing the case on a hard surface, wherein the case is in a closed position and the first and second ear-worn devices are within the case; and after placing the case on the hard surface, generating the vibration sequence by knocking on a hard surface with the case laying on the hard surface.

In a fourteenth aspect, in addition to one or more of the preceding or following aspects, or in the alternative to some aspects, the vibration sequence is generated by tapping the case on a hard surface, wherein the case is in a closed position and the first and second ear-worn devices are within the case.

In a fifteenth aspect, in addition to one or more of the preceding or following aspects, or in the alternative to some aspects, the case includes a volume control configured to receive user input, wherein the system is configured to control a volume setting of one or more of the first and second ear-worn devices using the volume control.

In a sixteenth aspect, a method of pairing a first ear-worn device and a second ear-worn device, each of the ear-worn devices includes: a speaker, a microphone, a processor, a non-transitory computer memory, a rechargeable battery, a charging contact, and a wireless communication device, wherein the first ear-worn device is configured to be positioned within a case so that the charging contact of the first ear-worn device is in electrical communication with a first case charging contact within the case. The second ear-worn device is configured to be positioned within the case so that the charging contact of the second ear-worn device is in electrical communication with a second case charging contact within the case. The case includes a battery and a case inertial measurement unit (IMU). The method includes detecting a vibration sequence at the case IMU after the first and second ear-worn devices enter a pairing mode, and deciding whether to pair the wireless communication devices of the first and second ear-worn devices based on the vibration sequence detected at the case IMU.

In a seventeenth aspect, in addition to one or more of the preceding or following aspects, or in the alternative to some aspects, the method further can include: inputting the vibration sequence detected at the case IMU to the processor of the first ear-worn device and to the processor of the second ear-worn device; each of the ear-worn devices comparing the vibration sequence detected at the case IMU to an expected vibration sequence; and if the vibration sequence detected at the case IMU sufficiently matches the expected vibration sequence, pairing the wireless communication device of the first ear-worn device to the wireless communication device of the second ear-worn device.

In an eighteenth aspect, in addition to one or more of the preceding or following aspects, or in the alternative to some aspects, the method can include the memory of each of the ear-worn devices receiving the vibration sequence detected at the case IMU via the charging contact.

In a nineteenth aspect, in addition to one or more of the preceding or following aspects, or in the alternative to some aspects, the method can include the memory of the case receiving a user input vibration sequence to define the expected vibration sequence and communicating the expected vibration sequence to the memory of the ear-worn devices.

In a twentieth aspect, in addition to one or more of the preceding or following aspects, or in the alternative to some aspects, the method can include: after pairing the wireless communication devices of the first and second ear-worn devices, lighting a positive indicator light on the case to indicate to a user that the first and second ear-worn devices are paired; and if the vibration sequence detected at the case IMU does not sufficiently match the expected vibration sequence, lighting a negative indicator light on the case to indicate to the user that the first and second ear-worn devices are not paired.

In a twenty-first aspect, in addition to one or more of the preceding or following aspects, or in the alternative to some aspects, the method can include: while the ear-worn devices are positioned in the case, the ear-worn devices detecting an open/close sequence can include making an electrical connection in response to closing the case and unmaking an electrical connection in response to opening the case; and in response to detecting the open/close sequence, the first and second ear-worn devices entering the pairing mode.

In a twenty-second aspect, in addition to one or more of the preceding or following aspects, or in the alternative to some aspects, the open/close sequence is detected at the charging contact of the first ear-worn device and the charging contact of the second ear-worn device.

In a twenty-third aspect, in addition to one or more of the preceding or following aspects, or in the alternative to some aspects, the open/close sequence includes opening and closing the case three times.

In a twenty-fourth aspect, in addition to one or more of the preceding or following aspects, or in the alternative to some aspects, the method can include pairing the first and second ear-worn devices with a smart phone. The method can include: placing the smart phone into a pairing mode; detecting the vibration sequence by a smart phone IMU at a same time as the vibration sequence is detected at the case IMU; and based on the vibration sequence detected by the smart phone IMU, a processor of the smart phone deciding whether to pair a wireless communication device of the smart phone with the wireless communication devices of the first and second ear-worn devices.

In a twenty-fifth aspect, in addition to one or more of the preceding or following aspects, or in the alternative to some aspects, the method can include: inputting the vibration sequence detected at the smart phone IMU to a processor of the smart phone; comparing the vibration sequence detected at the smart phone IMU to an expected vibration sequence;

and if the vibration sequence detected at the smart phone IMU sufficiently matches the expected vibration sequence, pairing the wireless communication device of the smart phone to the wireless communication devices of the first and second ear-worn devices.

In a twenty-sixth aspect, in addition to one or more of the preceding or following aspects, or in the alternative to some aspects, the method can include: if the vibration sequence detected at the case IMU does not sufficiently match the expected vibration sequence, presenting a message to a user on a display device of the smart phone indicating that the smart phone has not been paired to the first and second ear-worn devices.

In a twenty-seventh aspect, in addition to one or more of the preceding or following aspects, or in the alternative to some aspects, the method can include placing the smart phone on a hard surface before detecting the vibration sequence at the smart phone.

In a twenty-eighth aspect, in addition to one or more of the preceding or following aspects, or in the alternative to some aspects, the method can include: before detecting the vibration sequence, placing the case on a hard surface, wherein the case is in a closed position and the first and second ear-worn devices are within the case, and after placing the case on the hard surface, generating the vibration sequence by knocking on a hard surface with the case laying on the hard surface.

In a twenty-ninth aspect, in addition to one or more of the preceding or following aspects, or in the alternative to some aspects, the method can include generating the vibration sequence by tapping the case on a hard surface, wherein the case is in a closed position and the first and second ear-worn devices are within the case.

In a thirtieth aspect, a method of pairing a first ear-worn device and a second ear-worn device is provided. Each of the ear-worn devices includes a speaker, a microphone, a processor, a non-transitory computer memory, a rechargeable battery, a charging contact, an inertial measurement unit (IMU), and a wireless communication device. The first ear-worn device is configured to be positioned within a case so that the charging contact of the first ear-worn device is in electrical communication with a first case charging contact within the case, and the second ear-worn device is configured to be positioned within the case so that the charging contact of the second ear-worn device is in electrical communication with a second case charging contact within the case. The case includes a battery. The method includes detecting a first detected vibration sequence at the IMU or microphone of the first ear-worn device, detecting a second detected vibration sequence at the IMU or microphone of the second ear-worn device, comparing the first detected vibration sequence to an expected vibration sequence and comparing the second detected vibration sequence to the expected vibration sequence, and deciding whether to pair the wireless communication device of the first ear-worn device to the wireless communication device of the second ear-worn device based on the comparison.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE FIGURES

Aspects may be more completely understood in connection with the following figures (FIGS.), in which.

Figure 1:
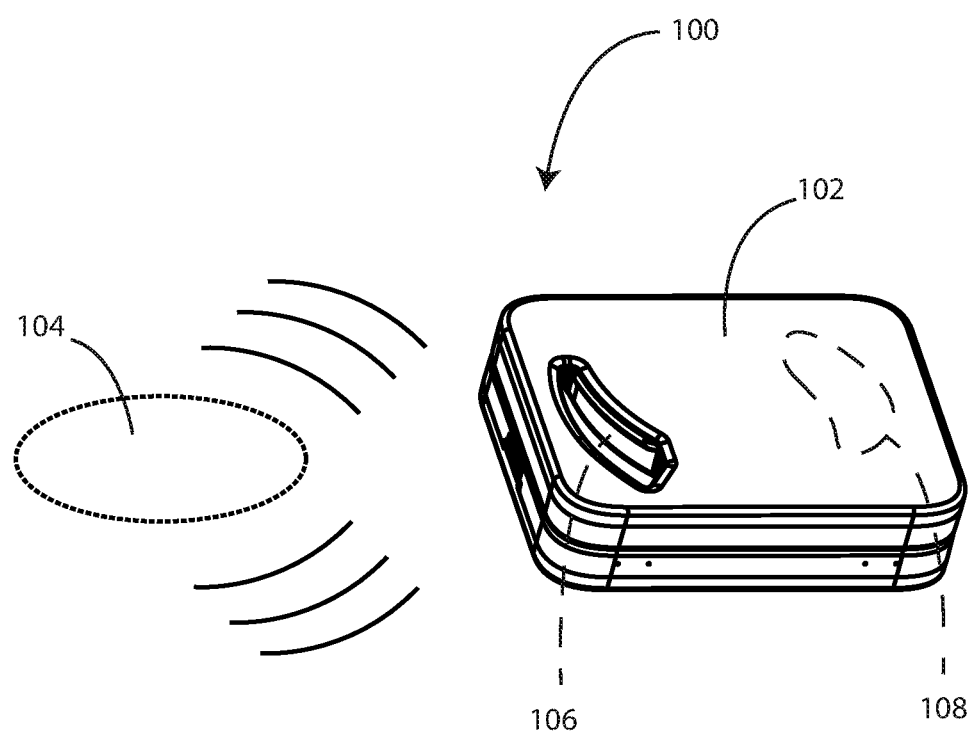
FIG. 1 is a front perspective view of a hearing assistance system, including an illustrative ear-worn device case in a closed position, near a location of impact on a hard surface, producing a vibration sequence.

While embodiments are susceptible to various modifications and alternative forms, specifics thereof have been shown by way of example and drawings and will be described in detail. It should be understood, however, that the scope herein is not limited to the particular aspects described. On the contrary, the intention is to cover modifications, equivalents, and alternatives falling within the spirit and scope herein.

DETAILED DESCRIPTION

A simple, user-friendly system and process for pairing two ear-worn devices for wireless communication, or for pairing two ear-worn devices with a smart phone, is described herein. The ear-worn devices are placed into a charging case and a lid of the case is closed. The ear-worn devices then are brought into a pairing mode. One option for bringing the ear-worn devices into a pairing mode is to have the user execute an open/close sequence of the lid of the case while the ear-worn devices detect the open/close sequence at charging contacts. In one example, the open/close sequence is performed by opening and closing the lid three times. Use of an open/close sequence of the lid of the charging case is often easy for users to execute, even if a user has limited dexterity. Use of an open/close sequence of the lid of the charging case is also easy for users to remember. Other approaches may be used for causing the ear-worn devices to enter a pairing mode.

Once the ear-worn devices have entered the pairing mode, the user creates a vibration sequence that is detected by an inertial measurement unit (IMU) of the case or detected simultaneously by an IMU or microphone of each ear-worn device. For example, the user can generate the vibration sequence by tapping the case on a table top or other hard surface. The user can alternatively place the case on a hard surface and knock the hard surface. The vibration sequence can be created by three taps of the case, three knocks, other numbers of impacts, or various temporal patterns of impacts. One example of a temporal pattern of impacts is two impacts followed by a pause and then a third impact. Many other temporal patterns of impacts are possible.

In various embodiments, the case IMU detects the vibration sequence, and the case communicates the vibration sequence to each ear-worn device. Alternatively, an IMU or microphone of each ear-worn device detects the vibration sequence. Each ear-worn device compares the vibration sequence detected at the case IMU to an expected vibration sequence. A processor of each ear-worn devices decides whether to pair the wireless communication devices of the first and second ear-worn devices based on the vibration sequence detected at the case IMU or at the IMUs of the ear-worn devices.

In one example, if the vibration sequence detected at the case IMU sufficiently matches the expected vibration sequence, a wireless communication device of the first ear-worn device is paired to a wireless communication device of the second ear-worn device.

In various examples, after pairing the first and second ear-worn devices, a positive indicator light on the case is lit to indicate to a user that the first and second ear-worn devices are paired. In various examples, if the vibration sequence detected at the case IMU does not sufficiently match the expected vibration sequence, a negative indicator light on the case is lit to indicate to the user that the first and second ear-worn devices are not paired.

To pair a wireless communication device of a smart phone to the wireless communication devices of two ear-worn devices, similar approaches as mentioned above can be used to place the ear-worn devices into a pairing mode. The user interface of the smart phone may be used to place the smart phone into a pairing mode. Then, the user creates a vibration sequence that is detected by an inertial measurement unit (IMU) of the phone and the IMU of the case or the IMU of each ear-worn device. For example, the user can place the smart phone on a hard surface and generate the vibration sequence by tapping the case on a hard surface. The user can alternatively place the smart phone and the case on a hard surface and knock the hard surface. The vibration sequence can be created by three taps of the case, three knocks, or other numbers or patterns of impacts.

FIG. 1 illustrates the physical environment for establishing pairing of a wireless communication device of a first ear-worn device and a wireless communication device of a second ear-worn device. FIG. 1 shows a hearing assistance system 100, including an ear-worn device case 102 in a closed position near a location of impact 104 on a hard surface. The case 102 contains a first ear-worn device 106 and a second ear-worn device 108. The locations of the first ear-worn device 106 and the second ear-worn device 108 within the case 102 are indicated by dashed lines, although the first ear-worn device 106 and second ear-worn device 108 are not directly visible with the case 102 in the closed position.

In various embodiments, the case 102 can be on a hard surface. An impact or series of impacts at the location of impact 104 produces a vibration sequence. In various embodiments, the case IMU is configured to detect the vibration sequence and communicate the vibration sequence to the first and second ear-worn devices. The first ear-worn device 106 can be configured to be positioned within the case 102 so that a charging contact of the first ear-worn device 106 is in electrical communication with a first case charging contact within the case 102. The second ear-worn device 108 can be configured to be positioned within the case 102 so that a charging contact of the second ear-worn device 108 is in electrical communication with a second case charging contact within the case 102. The communication of the vibration sequence from the case to the first and second ear-worn device can be accomplished using electrical communication at the charging contacts.

In various embodiments, the case may not have an IMU. In various embodiments, IMUs of the first and second ear-worn devices are configured to detect the vibration sequence.

Figure 2:
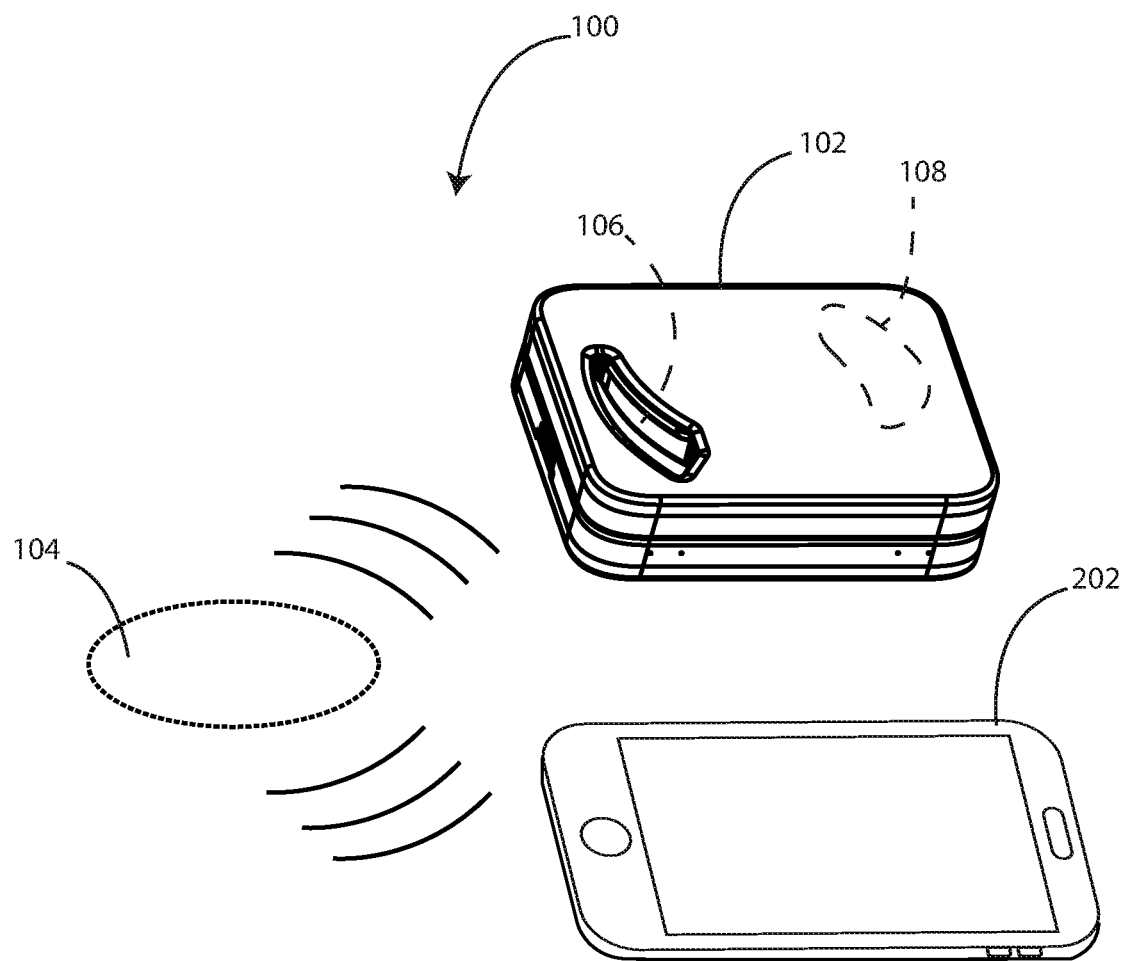
FIG. 2 is a front perspective view of another hearing assistance system, including an ear-worn device case in a closed position and a smart phone, near a location of impact on a hard surface.

FIG. 2 illustrates the physical environment for establishing pairing of a wireless communication device of a smart phone, wireless communication device of a first ear-worn device, and a wireless communication device of a second ear-worn device. A front perspective view of this hearing assistance system 100 is shown in FIG. 2, including an ear-worn device case 102 in a closed position and a smart phone 202 near a location of impact 104 on a hard surface. Within the case 102, the hearing assistance system 100 also includes a first ear-worn device 106 and a second ear-worn device 108.

Vibration Sequence

Further details about the vibration sequence will now be provided. However, it will be appreciated that this is merely provided by way of example and that further variations are contemplated herein.

In various embodiments, the case IMU detects the vibration sequence. The memory of the case stores instructions to input the vibration sequence detected at the case IMU to a processor of first ear-worn device and to a processor of the second ear-worn device. In various embodiments, the input occurs using electrical signals passing from the charging contacts of the case to the charging contacts of the first ear-worn device and second ear-worn device.

Alternatively, an IMU or microphone of each ear-worn device detects the vibration sequence. In these embodiments, the memory of each ear-worn device stores instructions to detect and receive the vibration sequence from an IMU or from a microphone of each ear-worn device.

Once the vibration sequence has been received by each ear-worn device, the processor compares the vibration sequence detected at the case IMU to an expected vibration sequence. A processor of each ear-worn devices decides whether to pair the wireless communication devices of the first and second ear-worn devices based on the vibration sequence detected at the case IMU or at the IMUs or microphones of the ear-worn devices.

In one example, if the vibration sequence detected at the case IMU sufficiently matches the expected vibration sequence, a wireless communication device of the first ear-worn device is paired to a wireless communication device of the second ear-worn device.

In various embodiments, a memory of the case stores instructions to accept a user input vibration sequence to define the expected vibration sequence and communicate the expected vibration sequence to the memory of the ear-worn devices. In one example, the user enters a settings mode so that the case is ready to receive the definition of the expected vibration sequence from the user.

To determine whether or not there is a sufficient a match between detected vibration sequence and an expected vibration sequence, the processor of each of the ear-worn devices compares a vibration over time profile of the detected vibration sequence and the expected vibration sequence using any one of a number of different matching algorithms. In some embodiments, a matching algorithm will output a match coefficient reflecting the closeness of the match. In various embodiments, the devices are paired if the matching coefficient is within a threshold value of a matching coefficient indicating a perfect match.

In various embodiments of a hearing assistance system including a charging case, a first and second ear-worn device, and a smart phone. The memory of the smart phone stores computer instructions for instructing the processor in the smart phone to perform steps including inputting the vibration sequence detected at the smart phone IMU to the processor of the smart phone. The smart phone is further configured to perform comparing the vibration sequence detected at the smart phone IMU to an expected vibration sequence. If the vibration sequence detected at the smart phone IMU sufficiently matches the expected vibration sequence, the smart phone is configured to perform pairing the wireless communication device of the smart phone with the wireless communication devices of the first and second ear-worn devices.

If the vibration sequence detected at the smart phone IMU does not sufficiently match the expected vibration sequence, in various embodiments, the smart phone is configured to present a message to a user on a display device of the smart phone indicating that the smart phone has not been paired to the first and second ear-worn devices In various embodiments, the vibration sequence is detected when the components of a hearing assistance system are located on a hard surface. For example, the case containing the first and second ear-worn device are positioned on a hard surface during the vibration sequence. In another example, the case containing the first and second ear-worn device and a smart phone are positioned on a hard surface during the vibration sequence.

In various embodiments, the case IMU is configured to detect a vibration sequence generated by: placing the case on a hard surface, wherein the case is in a closed position and the first and second ear-worn devices are within the case, and after placing the case on the hard surface, generating the vibration sequence by knocking on a hard surface with the case laying on the hard surface In various embodiments, the vibration sequence is generated by tapping the case on a hard surface, wherein the case is in a closed position and the first and second ear-worn devices are within the case. The user can alternatively place the case on a hard surface and knock the hard surface. The vibration sequence can be created by two taps, two knocks, three taps, three knocks, four taps, four knocks, or other numbers or patterns of impacts.

Charging Case Structure and Function

Figure 3:
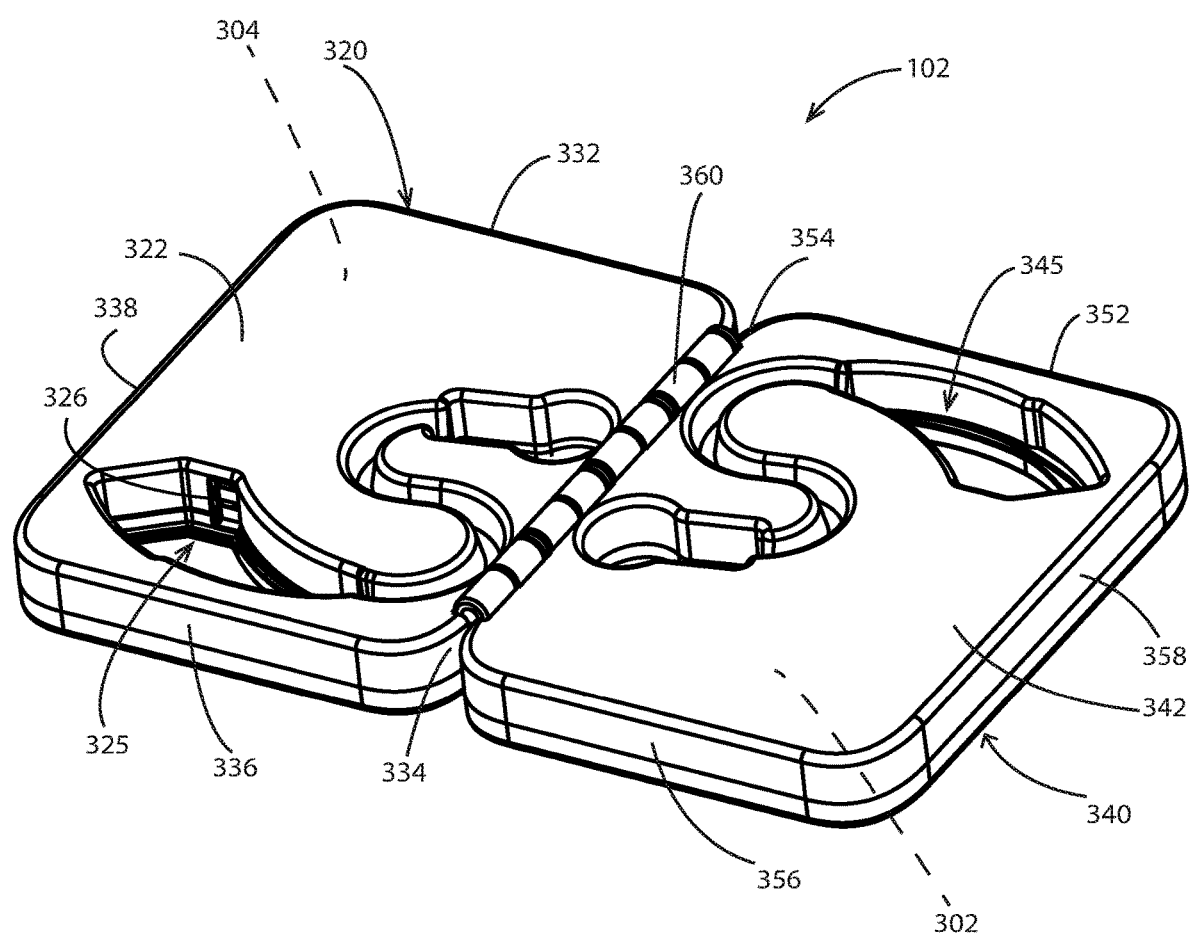
FIG. 3 is a perspective view of the ear-worn device case of FIGS. 1 and 2 in an open position.
Figure 4:
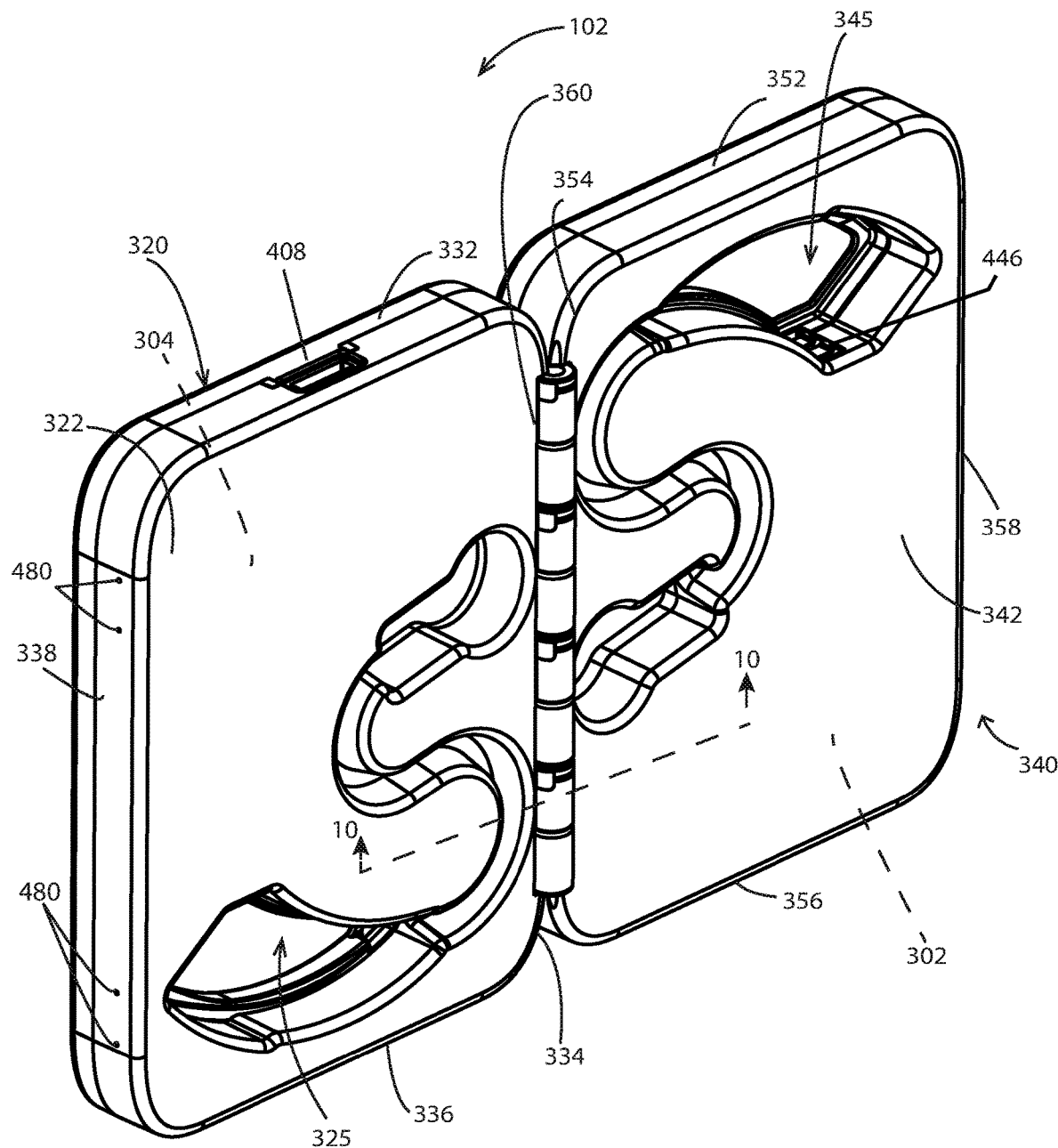
FIG. 4 is another perspective view of the ear-worn device case of FIGS. 1 and 2 in an open position.
Figure 6:
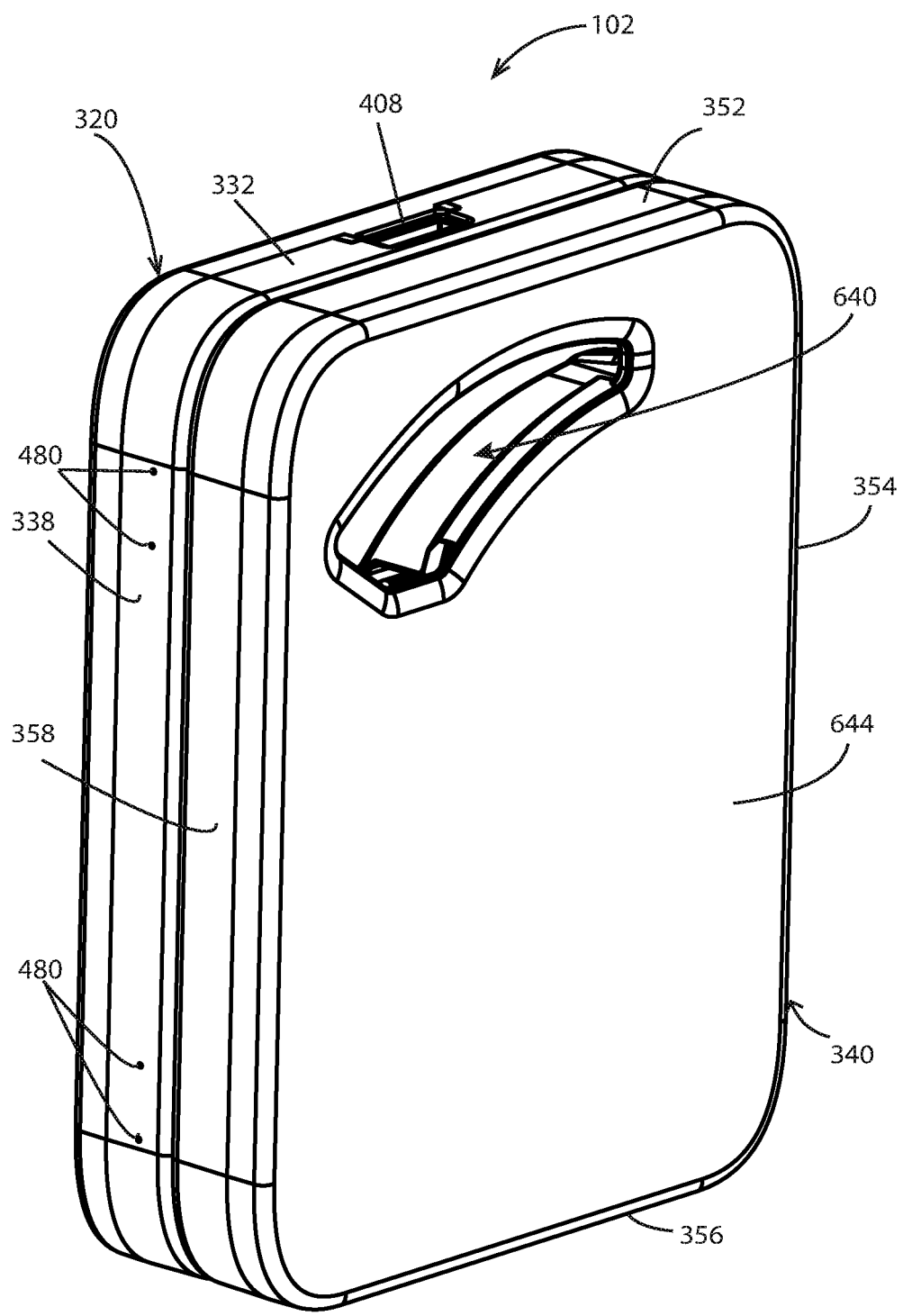
FIG. 6 is a rear perspective view of the ear-worn device case of FIGS. 1 and 2 in a closed position.
Figure 7:
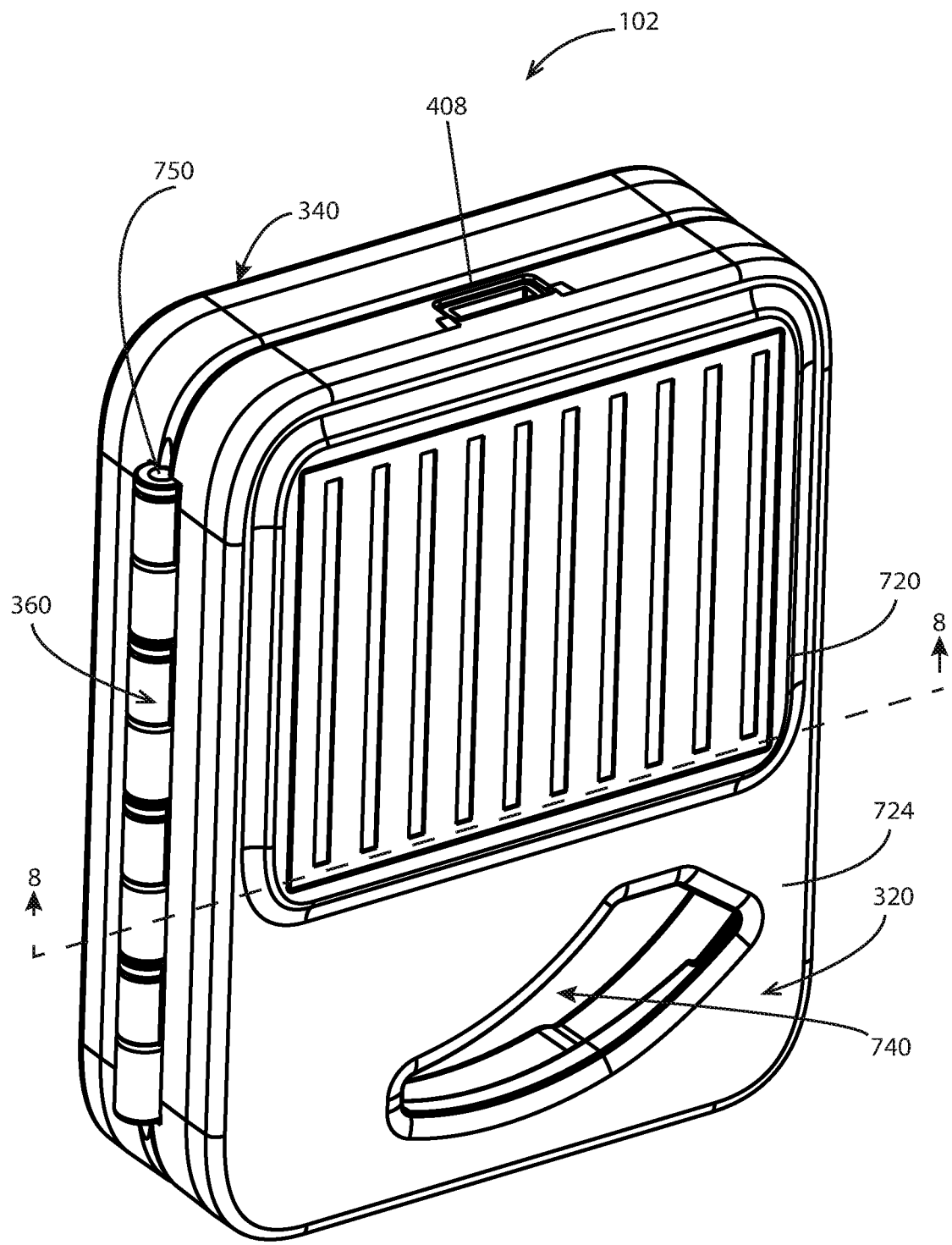
FIG. 7 is a front perspective view of the ear-worn device case of FIGS. 1 and 2 in a closed position.
Figure 12:
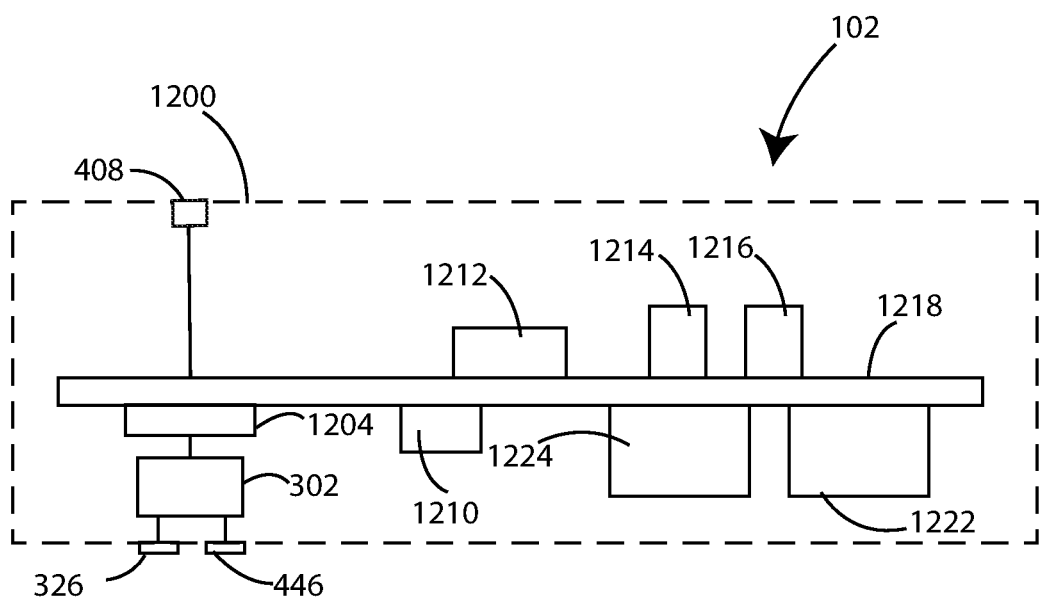
FIG. 12 is a schematic view of an ear-worn device charging case.

An example of a charging case for use with the system and method described herein will now be described with reference to FIGS. 3-4, showing the charging case in an open position, FIGS. 6-7 showing the charging case in a closed position, and FIG. 12 showing a schematic drawing of the charging case. Embodiments of the charging case are directed to storing, protecting, and charging ear-worn devices contained within the case. In various embodiments, the case may be configured to move between an open position and a closed position. The case may be sized to be easily held in a human hand, easily held in a typical pocket of clothing, and easily transported. As a result of the ease of transportation, a user is more likely to bring the case along with the user when away from home or even within the home. A safe place for storing the ear-worn devices and the ability to charge the hearing aids is therefore more likely to be close at hand to the user. In various embodiments, the case may be opened and closed with a single human hand.

FIG. 3 is a perspective view of the ear-worn device case of FIGS. 1 and 2 in an open position. FIG. 4 is a perspective view from a different angle of the ear-worn device case of FIGS. 1 and 2, also in an open position. In various embodiments, the case 102 includes a first body portion 320 and a second body portion 340 that can move with respect to each other. In various embodiments, the first body portion 320 and the second body portion 340 are joined at one or more hinges 360. The first body portion 320 is configured to receive a first ear-worn device 106 and the second body portion 340 is configured to receive a second ear-worn device 108.

The case defines a first cavity 325 for receiving a first ear-worn device 106 and a second cavity 345 for receiving a second ear-worn device 108. The first cavity 325 includes first case charging contacts 326 and the second cavity 345 includes second case charging contacts 446, which are visible only in FIG. 4. By positioning one ear-worn device in one body portion and another ear-worn device in another body portion, the contents of the case can be balanced, the size of the case can be made compact and easy to handle, and the placement of the ear-worn device can be intuitive for the user.

Other contents of the case can also be balanced. The case may further include a case battery 302 and case electronics 304 in order to charge the first and second ear-worn devices when they are within the cavities, among other optional functions. The locations of the case battery 302 and the case electronics 304 are balanced within the case 102 in various embodiments. For example, the electronics 304 can be contained in the first body portion 320 while the case battery 302 is contained within the second body portion 340.

In various examples, the case may be configured or adapted such that the ear-worn devices contained within the case are charging when the case is in a closed position, and, for example, not charging when the case is in the open position. Specifically, the case may include one or more contact points that interact with one another when the case is in the closed position to charge the ear-worn devices. As such, a user knows that the ear-worn devices contained within the case are charging when the case is in a closed position. In one or more embodiments, the case may also be configured or adapted such that the ear-worn devices contained within the case may charge when the case is in the open position In various embodiments, as shown in FIGS. 3-4 and 6, the case 102 includes one or more hinges 360 operably coupled between the first body portion 320 and the second body portion 340. A first portion of the one or more hinges 360 may be coupled to the first body portion 320 and a second portion of the one or more hinges 360 may be coupled to the second body portion 340 with a hinge pin 750 (FIG. 7) extending therethrough. As such, the first body portion 320 and the second body portion 340 may rotate about the hinge pin 750 to move relative to one another. In one or more embodiments, the one or more hinges 360 may include a biasing element such that the case 102 is biased into the open position and/or closed position. A latching element can also be provided to maintain the case in a closed position once it is closed.

The case 102 may also include a battery 302 and electronics 304 for charging the ear-worn devices when contained within the case 102. For example, the battery 302 may be disposed in one of the first and second body portions 320, 340 and the electronics 304 may be disposed in the other of the first and second body portions 320, 340. It is noted that while the battery 302 and electronics 304 are described as located within separate body portions, in some embodiments, the battery 302 and the electronics 304 may be located in the same body portion (e.g., the first body portion 320 or the second body portion 340). As shown in FIGS. 3-4, the battery 302 is positioned within the second body portion 340 and the electronics 304 are positioned within the first body portion 320. Each of the battery 302 and the electronics 304 are illustrated using broken lines to depict that the battery 302 and the electronics 304 that are contained within the second body portion 340 and the first body portion 320, respectively. In one or more embodiments, the case 302 may include a heat absorbing material, such as foam, proximate one or both of the battery 302 and the electronics 304. For example, the heat absorbing material may be positioned proximate one side of the battery 302, the electronics 304, or both to assist in increasing the effective heat path from the battery 302 and/or the electronics 304 towards the outer case surface.

The electronics 304 may be implemented, at least in part, in hardware, software, firmware, or any combination thereof. For example, various aspects of the techniques may be implemented within one or more processors, including one or more microprocessors, microcontrollers, DSPs, ASICs, FPGAs, or any other equivalent integrated or discrete logic circuitry, as well as any combinations of such components, or other devices. The term "processor" or "processing circuitry" may generally refer to any of the foregoing logic circuitry, alone or in combination with other logic circuitry, or any other equivalent circuitry. Such hardware, software, and/or firmware may be implemented within the same system or within separate systems to support the various operations and functions described in this disclosure. In addition, any of the described components may be implemented together or separately as discrete but interoperable logic devices.

When implemented in software, the functionality ascribed to the systems, devices and methods described in this disclosure may be embodied as instructions and/or logic on a computer-readable medium such as RAM, ROM, NVRAM, EEPROM, FLASH memory, magnetic data storage media, optical data storage media, or the like. The instructions and/or logic may be executed by one or more processors to support one or more aspects of the functionality described in this disclosure.

FIG. 12 is a schematic view of one embodiment of a charging case. In various embodiments, the case 102 includes a case battery 302, a case processor 1212, a case sensor package 1214, a case inertial measurement unit (IMU) 1216, a case control circuit 1222, and a case non-transitory computer memory 1224, which are all connected to a circuit board 1218. The case 102 also includes a case housing 1200. The case 102 also includes a power supply circuit 1204 connected to a first case charging contact 326, a second case charging contact 446, and the case battery 302. The case 102 also includes one or more indicator lights 480, an interface port 408, and user switches 1210.

In various embodiments, the user switches 1210 include a volume control configured to receive user input, where the case is configured to control a volume setting of one or more of the first and second ear-worn devices using the volume control.

Indicator Lights (FIGS. 4, 6, and 12)

In various embodiments, the case 102 may include indicator lights 480 to provide a visual indicator regarding the status of components within the case 102. For example, the indicator lights 480 may communicate the power level/status of the ear-worn devices or the battery 302 contained within the case 102. The indicator lights 480 can be seen in the drawings in the perspective view of an open case in FIG. 4, the perspective view of a closed case in FIG. 6, and the schematic view of FIG. 12.

In various embodiments, if a vibration sequence detected at the case IMU sufficiently matches the expected vibration sequence, a positive indicator light on the case 102, such as a green indicator light, is lit after pairing the wireless communication devices of the first and second ear-worn devices, to indicate to a user that the first and second ear-worn devices are paired. In various embodiments, if a vibration sequence detected at the case IMU does not sufficiently match the expected vibration sequence, a negative indicator light on the case, such as a red, orange or flashing indicator light, is lit, to indicate to the user that the first and second ear-worn devices are not paired.

The indicator lights 480 may be located anywhere on the case 102, such as the first body portion 320, the second body portion 340, top sides 332, 352, hinge sides 334, 354, bottom sides 336, 356, or latch sides 338, 358. As shown in the example of FIGS. 4 and 6, the indicator lights 480 are located on the latch side 338, for example, opposite the hinge side 334, of the first body portion 320.

Further, the indicator lights 480 may be aligned to correspond with the component for which the indicator light 480 tracks the status. For example, as shown in FIG. 4, the indicator lights 480 closer to the top side 332 may correspond to the ear-worn device in the second body portion 340, which is closer to the top side 332. The indicator lights 480 closer to the bottom side 336 may correspond to the ear-worn device in the first body portion 320, which is closer to the bottom side 336. In one or more embodiments, the case 102 may include indicator lights on the hinge side 334, 354 of the first or second body portion 320, 340 to indicate the state of charge of the battery 302.

Interface Port (FIGS. 4, 6-7, and 12)

The case 102 may also include an interface port 408, as can be seen in the drawings in the perspective view of an open case in FIG. 4, the perspective views of a closed case in FIGS. 6-7, and the schematic view of FIG. 12. The interface port 408 may be adapted to receive a connector (e.g., cable) to provide electronic communication with the battery 302 and the electronics 304. For example, a charging cable may be received by the interface port 408 to charge the battery 302 located within the case 102. In one or more embodiments, a connector may be inserted into the interface port 408 to draw power from the battery 302 within the case 102. The case 102 may include any number of interface ports 408. The interface ports 408 may be positioned at any suitable location on the case 102. For example, as shown in FIGS. 4 and 6-7, the interface port 408 is located on the top side 332 of the first body portion 320 (e.g., the same side as the electronics 304). Positioning the interface port 408 on the first body portion 320 with the electronics 304 allows the interface port 408 to directly communicate with the electronics 304. In other embodiments, the interface port 408 may be located on the same body portion as the battery 302 (e.g., if the interface port 408 is configured to draw power from the battery 302). In one or more embodiments, the case 102 may include a rib or stop to prevent the interface port 408 from being rotated or torqued off the PCB solder pad mounts by a force applied to the interface port 408 through, for example, a cable attached thereto.

Figure 8:
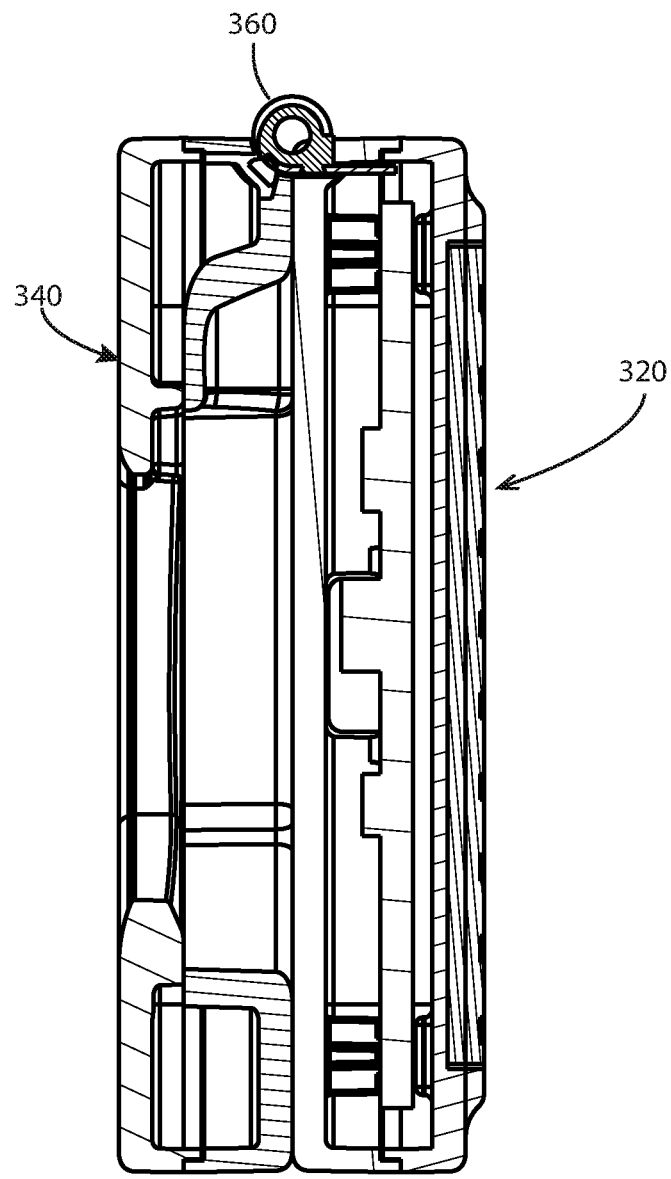
FIG. 8 is a cross-sectional view of the case of FIG. 7 taken along line 8-8.
Figure 9:
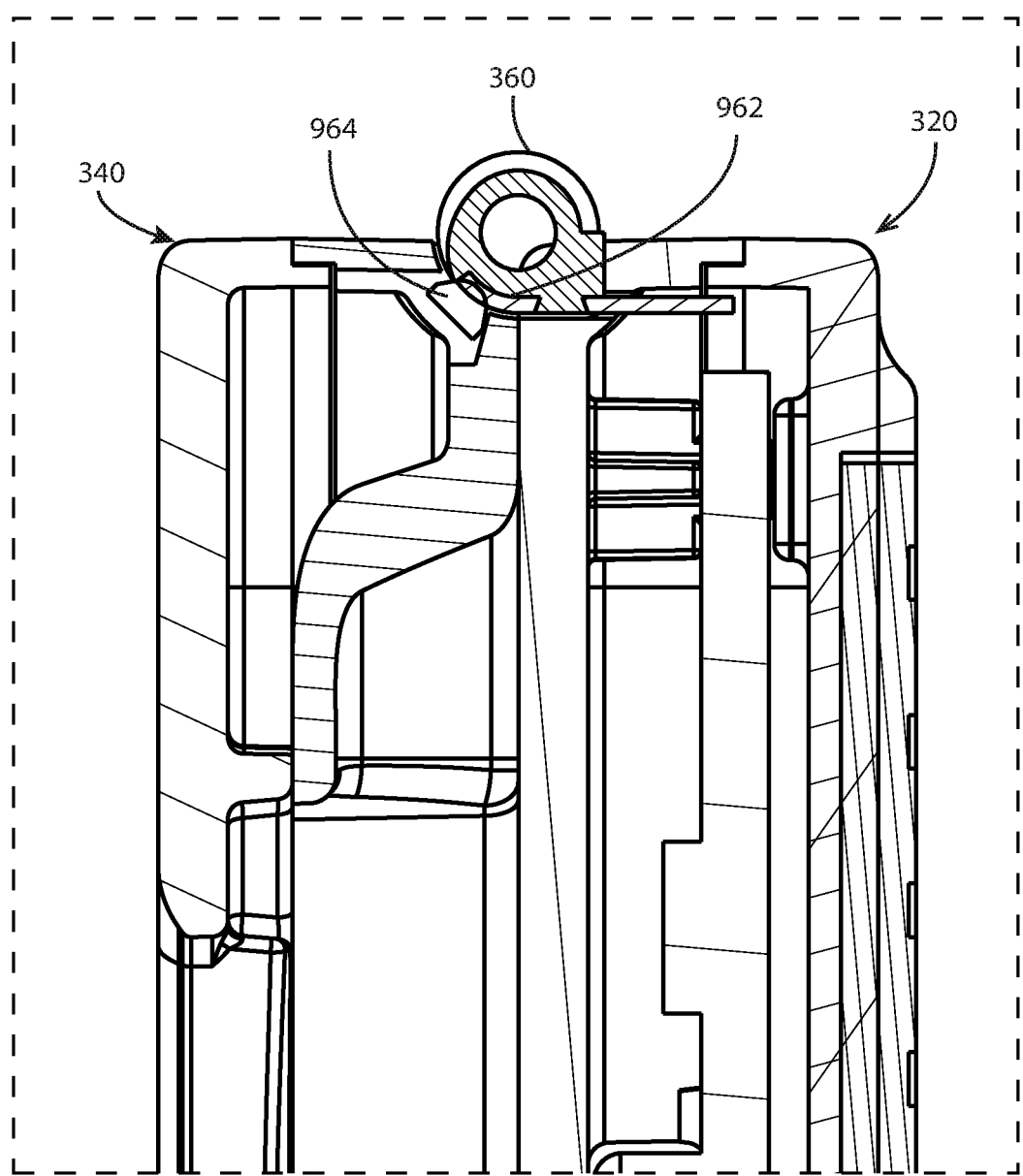
FIG. 9 is an enlarged view of the cross-sectional view of FIG. 8.
Figure 10:
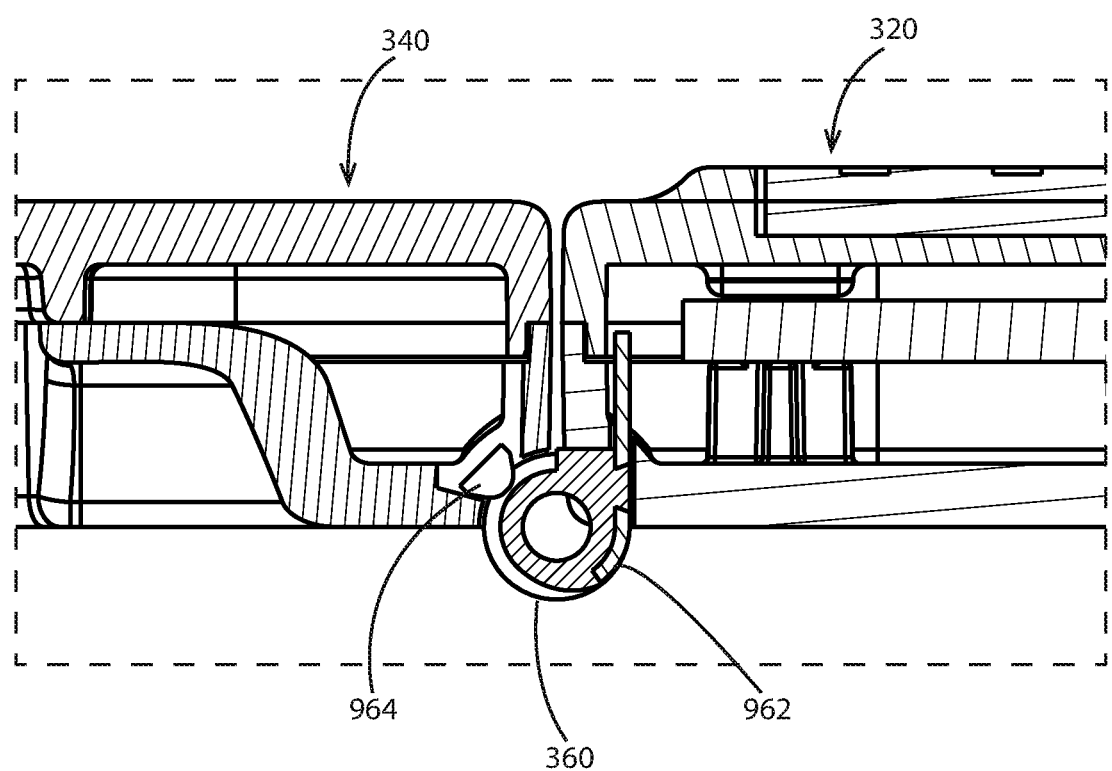
FIG. 10 is an enlarged cross-sectional view of the case of FIG. 7 in an open position.

Hinge Structure and Case Open/Close Sequence (FIGS. 8-10)

The details of various examples of a hinge structure and of using an open/close sequence of the case to put the ear-worn devices into a pairing mode will now be described with reference to FIGS. 8-10. FIG. 8 is a cross-sectional view of the case of FIG. 7 taken along line 8-8, showing the case in a closed position, and FIG. 9 is an enlarged view of the cross-sectional view of FIG. 8. FIG. 10 is an enlarged cross-sectional view of the case of FIG. 7 in an open position.

In various embodiments, electronics of the first ear-worn device and the second ear-worn device can detect when the case is opened or closed. In various embodiments, an open/close sequence of the case is used to place the first ear-worn device 106 and the second ear-worn device 108 in a pairing mode. In various embodiments, while the ear-worn devices are positioned in the case, the ear-worn devices detecting an open/close sequence of the case. An open/close sequence of the case includes making an electrical connection in response to closing the case and unmaking an electrical connection in response to opening the case. The first ear-worn device and second ear-worn device are programmed to enter a pairing mode in response to detecting the open/close sequence. In various embodiments, the open/close sequence is detected at the charging contact 326 of the first ear-worn device 106 and the charging contact 446 of the second ear-worn device 108. In various embodiments, the open/close sequence that initiates a pairing mode includes opening and closing the case two times, three times, four times, or other numbers of times.

The one or more hinges 360 may be adapted or configured to connect the battery 302 and the electronics 304 depending on whether the case 102 is in the closed position or the open position. For example, the one or more hinges 360 may operably connect the battery 302 and the electronics 304 when the case 102 is in the closed position. Further, the one or more hinges 360 may isolate the battery 302 from the electronics 304 when the case 102 is in the open position. As a result, when the case 102 is in the closed position, and when the ear-worn devices are positioned within the first and second cavities 325, 345, the battery 302 is operably coupled to the electronics 304 such that power is delivered to the ear-worn devices for charging. The connection to the battery 302 can be detected at the charging contacts of the first ear-worn device 106 and the second ear-worn device 108. As a result, the processor of the first ear-worn device 106 and the second ear-worn device 108 can detect when the case 102 is open and when the case 102 is closed. Further, in various embodiments, the memory in the first ear-worn device 106 and the memory in the second ear-worn device 108 stores computer instructions to detect the opening or closing of the case 102. In various embodiments, the memory in the first ear-worn device 106 and the memory in the second ear-worn device 108 stores computer instructions to detect an open/close sequence of the case 102.

As shown in FIGS. 9-10, the one or more hinges 360 may include one or more contact points so that power is only supplied to the ear-worn devices when the case 102 is in the closed position (e.g., as shown in FIGS. 8-9). For example, the one or more contact points may include a first contact point 962 that moves along with the first body portion 320 (e.g., attached to the portion of the hinge fixed to the first body portion 320) and a second contact point 964 that moves along with the second body portion 340 (e.g., attached to the portion of the hinge fixed to the second body portion 340). When the case 102 is in the closed position (FIG. 9), the one or more contact points are aligned to operably couple the battery 302 and the electronics 304, and provide power to the charging contacts 326, 446. Specifically, the first contact point 962 is aligned with the second contact point 964 when the case 102 is in the closed position. When the case 102 is in the open position (FIG. 10), the one or more contact points break alignment to, e.g., prevent power from reaching the charging contacts 326, 446. Specifically, the first contact point 962 is not aligned with the second contact point 964 when the case 102 is in the open position. The one or more contact points may be positioned within the one or more hinges 360 to shield the one or more contact points from user and environmental interaction.

In various embodiments, the one or more hinges 360 may define openings to route wire (e.g., insulated wire) between the first and second body portions 320, 340. For example, the one or more hinges may define a first opening proximate the first body portion 320 and a second opening proximate the second body portion 340. The wire carrying electrical current, signals, or both passing through the openings between the first and second body portions 320, 340 into an internal space of each of the first and second body portions 320, 340 may connect various electrical components, such as batteries, circuit boards, etc. The openings may provide a suitable strain relief to the wire by allowing the wire to freely move without restriction, such that the wire may be prevented from impingement. Therefore, the electrical connection between the first and second body portions 320, 340 may be unaffected by whether the case 102 is in the open position or the closed position.

The first and second body portions 320, 340 can be formed of many different materials, including a polymer, a metal, a glass, a ceramic or a composite. In various embodiments, the polymer can include or be a thermoplastic, a thermoset or a synthetic. The charging contacts of the case and ear-worn devices can be formed of many different materials. In some embodiments, the charging contacts can include a metal. In various embodiments, the metal can include or be an elemental metal or a metal alloy.

Figure 5:
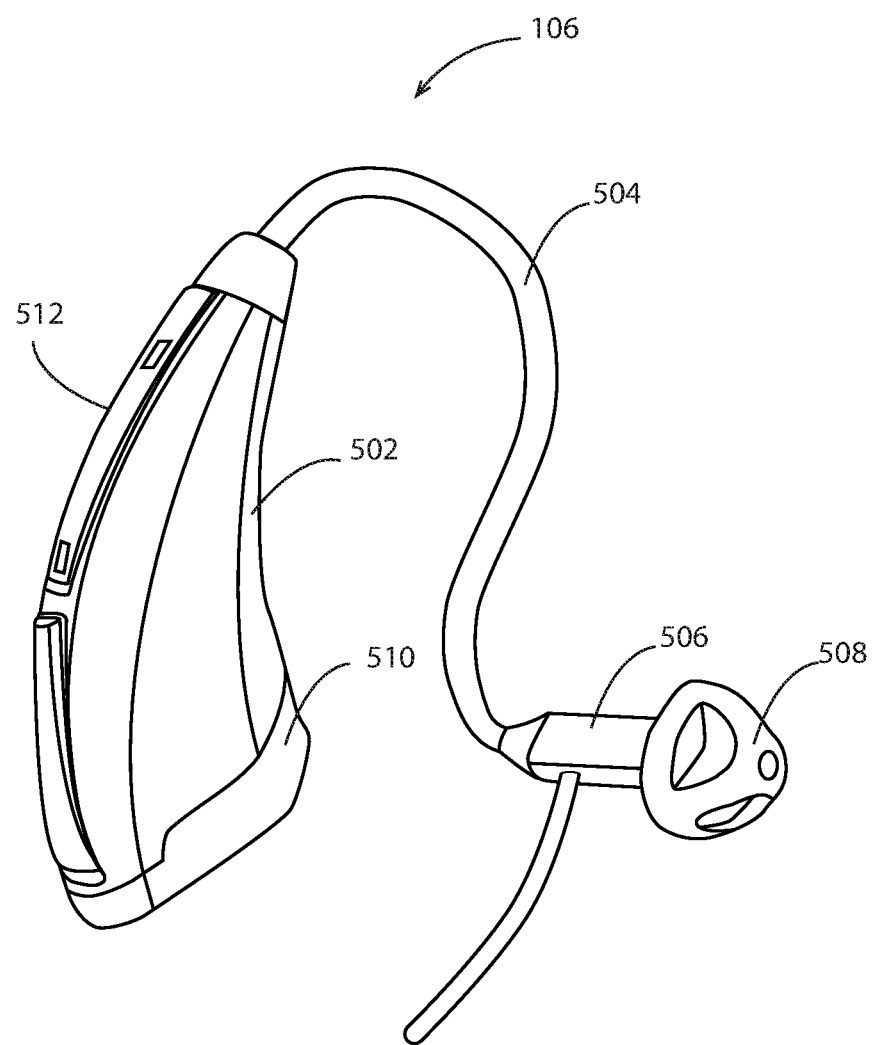
FIG. 5 is a perspective view of an ear-worn device of the hearing assistance system of FIGS. 1 and 2.
Figure 13:
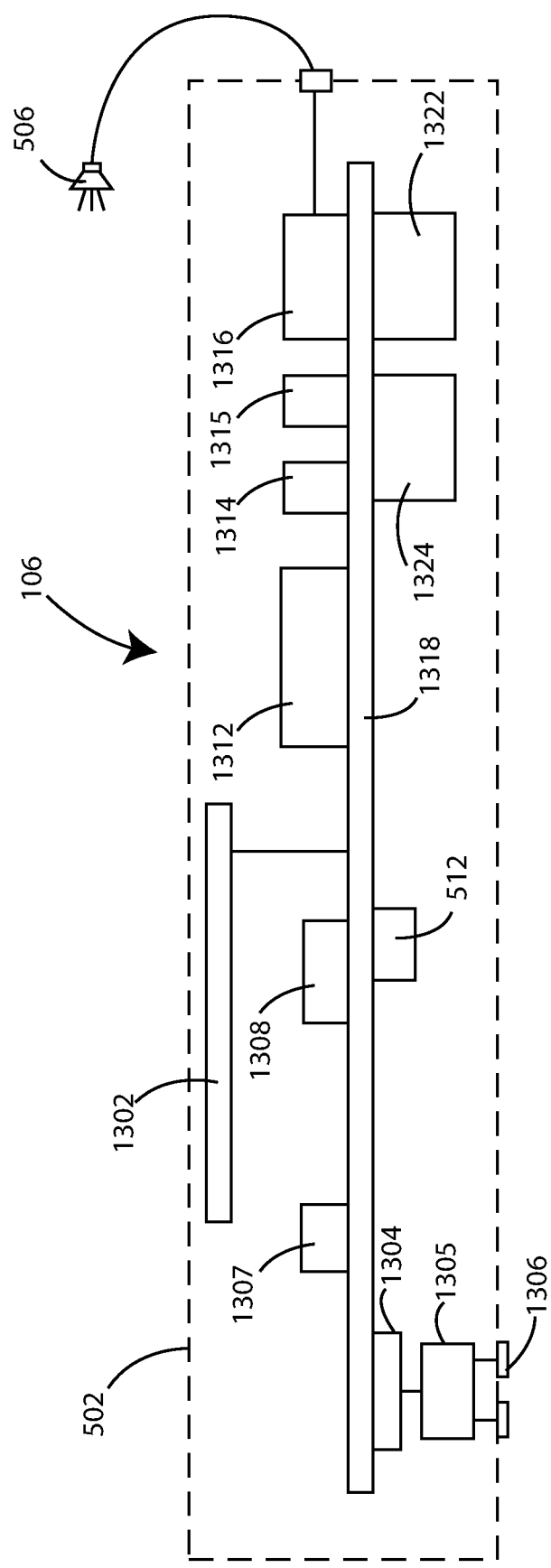
FIG. 13 is a schematic view of an ear-worn device.

Ear-Worn Device (FIG. 5 and FIG. 13)

A first ear-worn device and a second ear-worn device are included in the system described herein. Each ear-worn device is configured to be positioned within the case so that a charging contact of the ear-worn device is in electrical communication with a case charging contact within the case. An example of an ear-worn device will now be described with reference to FIG. 5, a perspective view, and FIG. 13, a schematic view.

Referring now to FIG. 5, a perspective view of an exemplary ear-worn device 106 is shown in accordance with various embodiments herein. The ear-worn device 106 can include an ear-worn device housing 502. The housing 502 is configured to be positioned within the case so that a charging contact of the ear-worn device 106 is in electrical communication with a case charging contact within the case. The ear-worn device housing 502 can define a battery compartment 510 into which a battery can be disposed to provide power to the device. In various embodiments, the battery is a rechargeable battery.

The ear-worn device 106 can also include a receiver 506 adjacent to an earbud 508. The receiver 506 an include a component that converts electrical impulses into sound, such as an electroacoustic transducer, speaker, or loud speaker. A cable 504 or connecting wire can include one or more electrical conductors and provide electrical communication between components inside of the ear-worn device housing 502 and components inside of the receiver 506.

The ear-worn device 106 shown in FIG. 5 is a receiver-in-canal type device and thus the receiver is designed to be placed within the ear canal. However, it will be appreciated that may different form factors for ear-worn devices, including hearing assistance devices, are contemplated herein. As such, ear-worn devices or hearing assistance devices herein can include, but are not limited to, behind-the-ear (BTE), in-the ear (ITE), in-the-canal (ITC), invisible-in-canal (IIC), receiver-in-canal (RIC), receiver in-the-ear (RITE) and completely-in-the-canal (CIC) type devices.

Ear-worn devices of the present disclosure can incorporate an antenna arrangement coupled to a high-frequency radio, such as a 2.4 GHz radio. The radio can conform to an IEEE 802.11 (e.g., WiFi® standard) or Bluetooth® standard (e.g., BLE, Bluetooth® 4.2 or 5.0) specification, for example. It is understood that ear-worn devices of the present disclosure can employ other radios, such as a 900 MHz radio. Ear-worn devices of the present disclosure can be configured to receive streaming audio (e.g., digital audio data or files) from an electronic or digital source. Representative electronic/digital sources (also referred to herein as accessory devices) include an assistive listening system, a TV streamer, a radio, a smart phone, a cell phone/entertainment device (CPED) or other electronic device that serves as a source of digital audio data or files.

Referring now to FIG. 13, a schematic block diagram is shown with various components of an ear-worn device in accordance with various embodiments. The block diagram of FIG. 13 represents a generic ear-worn device for purposes of illustration. The ear-worn device 106 shown in FIG. 13 includes several components electrically connected to a flexible mother circuit 1318 (e.g., flexible mother board) which is disposed within housing 502. A power supply circuit 1304 can include a battery 1305, can be electrically connected to the flexible mother circuit 1318, and provides power to the various components of the ear-worn device 106. One or more charging contacts 1306 are connected to the battery 1305 and are configured to interface with the charging contacts of the charging case.

One or more microphones 1307 are electrically connected to the flexible mother circuit 1318, which provides electrical communication between the microphones 1307 and a digital signal processor (DSP) 1312. Among other components, the DSP 1312 incorporates or is coupled to audio signal processing circuitry configured to implement various functions described herein. One or more user switches 512 (e.g., on/off, volume, mic directional settings) are electrically coupled to the DSP 312 via the flexible mother circuit 318.

A sensor package 1314 can be coupled to the DSP 1312 via the flexible mother circuit 1318. The sensor package 1314 can include one or more different specific types of sensors. The ear-worn device includes an ear-worn device IMU 1315. The IMU 1315 is configured to detect a vibration sequence as a part of a pairing method for the wireless communication device 1308, among other useful data that can be ascertained from IMU 1315.

As used herein the term "inertial measurement unit" or "IMU" shall refer to an electronic device that can generate signals related to a body's specific force and/or angular rate. IMUs herein can include one or more accelerometers (3, 6, or 9 axis) to detect linear acceleration, a gyroscope to detect rotational rate, or both. In some embodiments, in the alternative or in addition, an IMU includes a magnetometer to detect a magnetic field.

An audio output device 1316 is electrically connected to the DSP 1312 via the flexible mother circuit 1318. In some embodiments, the audio output device 1316 comprises a speaker (coupled to an amplifier). In other embodiments, the audio output device 1316 comprises an amplifier coupled to an external receiver 506 adapted for positioning within an ear of a wearer. The external receiver 506 can include an electroacoustic transducer, speaker, or loud speaker.

The ear-worn device 106 may incorporate a wireless communication device 1308 coupled to the flexible mother circuit 1318 and to an antenna 1302 directly or indirectly via the flexible mother circuit 1318. The communication device 1308 can be a Bluetooth® transceiver, such as a BLE (Bluetooth® low energy) transceiver or another transceiver (e.g., an IEEE 802.11 compliant device). The communication device 1308 can be configured to communicate with one or more external devices, such as a wireless communication device of a charging case, a wireless communication device of another ear-worn device, a wireless communication device of a smart phone, or a wireless communication device of another system, such as other systems discussed herein, in accordance with various embodiments. In various embodiments, the communication device 1308 can be configured to communicate with an external visual display device such as a smart phone, a video display screen, a tablet, a computer, or the like.

In various embodiments, the ear-worn device 106 can also include a control circuit 1322 and a memory storage device 1324. The control circuit 1322 can be in electrical communication with other components of the device. The control circuit 1322 can execute various operations, such as those described herein. The control circuit 1322 can include various components including, but not limited to, a microprocessor, a microcontroller, an FPGA (field-programmable gate array) processing device, an ASIC (application specific integrated circuit), or the like. The memory storage device 1324 can include both volatile and non-volatile memory. The memory storage device 1324 can include ROM, RAM, flash memory, EEPROM, SSD devices, NAND chips, and the like. The memory storage device 1324 can be used to store data from sensors as described herein and/or processed data generated using data from sensors as described herein, including, but not limited to, information regarding exercise regimens, performance of the same, visual feedback regarding exercises, and the like.

It is noted that the structure and housing of the second ear-worn device is not illustrated herein but may be similar to or identical to the first ear-worn device.

Figure 11:
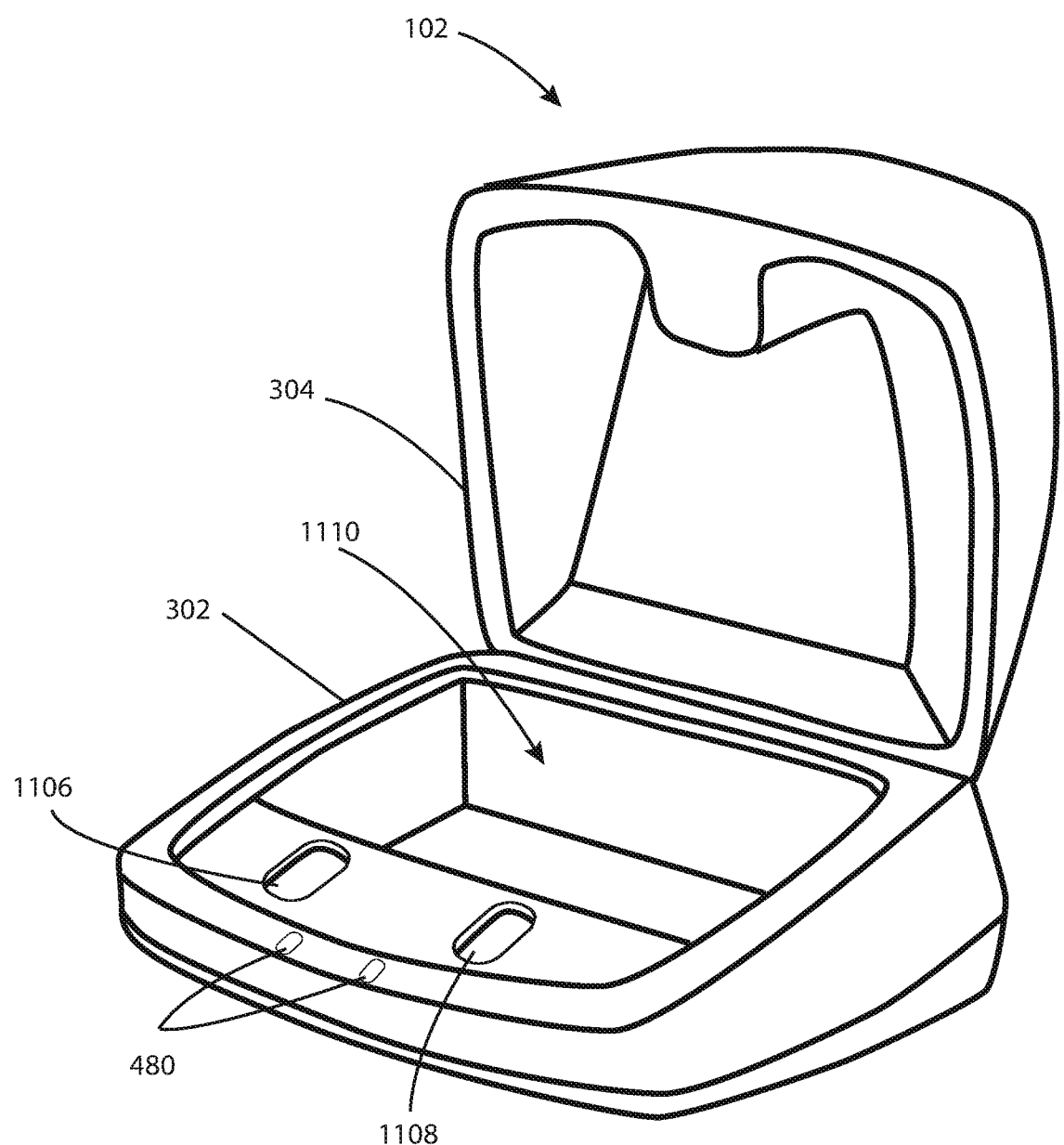
FIG. 11 is a perspective view of an alternate ear-worn device case in an open position.

Alternate Charging Case (FIG. 11)

Many different configurations of charging cases can be used with the systems and methods described herein. Referring now to FIG. 11, a perspective view of an alternate ear-worn device charging case 102 is shown in an open position, which can be part of a hearing assistance system including first and second ear-worn devices (not shown in this view). The case 102 includes a first body portion 320. The case 102 also includes a second body portion 340, formed as a lid that rotates away from the first body portion 320 about a hinge. The first body portion 320 define a first well 1106 and a second well 1108. An ear-worn device housing, for example, an ear-worn device housing 502 shown in FIG. 5, can fit within each well 1106, 1108.

As in other charging case examples described herein, the case includes two case charging contacts, one for each ear-worn device. In various embodiments, charging contacts are positioned in each well 1106, 1108. The first ear-worn device is configured to be positioned within the case so that the charging contact of the first ear-worn device is in electrical communication with the first case charging contact within the case. The second ear-worn device is configured to be positioned within the case so that the charging contact of the second ear-worn device is in electrical communication with the second case charging contact within the case.

The first body portion 320 of the case 102 also defines a receiver cavity 1110 for holding each of the receivers that are attached by a cable to each device housing that is situated in each well. The case 102 also includes indicator lights 480. The case 102 may further include a user input device and other charging case features described herein.

Methods for Pairing Two Ear-Worn Devices

In an embodiment, a method of pairing a first ear-worn device and a second ear-worn device having a charging case is described herein. The method includes detecting a vibration sequence at a case IMU after the first and second ear-worn devices enter a pairing mode. The method further includes deciding whether to pair the wireless communication devices of the first and second ear-worn devices based on the vibration sequence detected at the case IMU.

In an embodiment, the method can further include inputting the vibration sequence detected at the case IMU to the processor of the first ear-worn device and to the processor of the second ear-worn device. Then, each of the ear-worn devices compares the vibration sequence detected at the case IMU to an expected vibration sequence. If the vibration sequence detected at the case IMU sufficiently matches the expected vibration sequence, then the wireless communication device of the first ear-worn device is paired to the wireless communication device of the second ear-worn device.

One way for the memory of each of the ear-worn devices to receive the vibration sequence detected at the case IMU is via electrical signals received at the charging contact. In one embodiment, the processor of the case IMU causes voltage variations at the case charging contacts which are detected by the ear-worn devices via the charging contacts of the ear-worn devices. The voltage variations are used to communicate the vibration sequence to the first and second ear-worn devices.

In an embodiment, the method can further include the memory of the case receiving a user input vibration sequence to define the expected vibration sequence and communicating the expected vibration sequence to the memory of the ear-worn devices. Before receiving the user input vibration sequence, the user causes the case to enter a settings mode so that the case will be ready to record the definition of the expected vibration sequence. Many different impact patterns could be used to record the expected vibration sequence. For example, three knocks, three taps of the charging case, or other impact patterns could be defined as the expected vibration sequence.

An indication to the user can be provided upon completion of the pairing process. In one embodiment, the method can include lighting a positive indicator light on the case to indicate to a user that the first and second ear-worn devices are paired, after pairing the wireless communication devices of the first and second ear-worn devices. Examples of a positive indicator light include a specific color or light pattern. For example, a green light or a light that is continuously lit for a period of time may be a positive indicator light.

It is also helpful to provide a negative indication to the user if the pairing process is attempted but is not successful. If the vibration sequence detected at the case IMU does not sufficiently match the expected vibration sequence, the method can include lighting a negative indicator light on the case to indicate to the user that the first and second ear-worn devices are not paired. Examples of a negative indicator light include a specific color or light pattern. For example, a red or orange light or a light that is flashing or rapidly flashing may be a negative indicator light.

Many different options are available for causing the ear-worn devices to enter a pairing mode. For example, while the ear-worn devices are positioned in the case, the ear-worn devices can detect an open/close sequence that includes making an electrical connection in response to closing the case and unmaking an electrical connection in response to opening the case. In response to detecting the open/close sequence, the first and second ear-worn devices can be programmed to enter the pairing mode. When it is described that the ear-worn devices are entering a pairing mode, it may mean that the wireless communication device of each ear-worn device is entering a pairing mode.

In an embodiment of the method, the open/close sequence is detected at the charging contact of the first ear-worn device and the charging contact of the second ear-worn device. In an embodiment of the method, the open/close sequence comprises opening and closing the case three times.

Another option for causing the ear-worn devices to enter a pairing mode is to activate a user input device on the ear-worn devices and have the memory of the devices programmed with instructions so that a specific user input causes entry of the pairing mode. For example, the ear-worn devices can have a push button. One option is that a push sequence can be executed on a first ear-worn device, and then the same push sequence can be executed on the second ear-worn device, and for that push sequence to cause the ear-worn devices to enter a pairing mode.

Another option for causing the ear-worn devices to enter a pairing mode involves the use of a proximity sensor in the case. In these embodiments, the case can also include a proximity sensor and the devices can include a proximity sensor trigger. The case can detect if the ear-worn devices are nearby. If the case detects that the ear-worn devices are nearby, the case can ask the ear-worn devices if they are already paired. If the ear-worn devices are not already paired to each other, the case can instruct the ear-worn devices to enter a pairing mode. This approach to entering the pairing mode is most likely to be utilized when the case includes an IMU.

In various embodiments, the user places the case on a hard surface, where the case is in a closed position and the first and second ear-worn devices are within the case, and after placing the case on the hard surface. Then, the user generates the vibration sequence by knocking on a hard surface with the case laying on the same hard surface. Alternatively, in an embodiment, the method can include generating the vibration sequence by tapping the case on a hard surface, wherein the case is in a closed position and the first and second ear-worn devices are within the case.

Methods for Pairing Two Ear-Worn Devices and a Smart Phone

In various embodiments, a method of pairing a first ear-worn device and a second ear-worn device having a charging case and a smart phone is described herein. The method can include placing the smart phone into a pairing mode. This may be done using a user interface of the smart phone. The method can further include placing the ear-worn devices into a pairing mode. The method can include detecting a vibration sequence by a smart phone IMU at a same time as the vibration sequence is detected at the case IMU. Based on the vibration sequence detected by the smart phone IMU, a processor of the smart phone decides whether to pair a wireless communication device of the smart phone with the wireless communication devices of the first and second ear-worn devices.

In an embodiment, the method can further include: inputting the vibration sequence detected at the smart phone IMU to a processor of the smart phone, comparing the vibration sequence detected at the smart phone IMU to an expected vibration sequence, and if the vibration sequence detected at the smart phone IMU sufficiently matches the expected vibration sequence, pairing the wireless communication device of the smart phone to the wireless communication devices of the first and second ear-worn devices.

In an embodiment, the method can further include: if the vibration sequence detected at the case IMU does not sufficiently match the expected vibration sequence, presenting a message to a user on a display device of the smart phone indicating that the smart phone has not been paired to the first and second ear-worn devices.

In an embodiment, the method can further include placing the smart phone on a hard surface before detecting the vibration sequence at the smart phone.

Alternate Methods for Pairing Using an IMU or Microphone of Two Ear-Worn Devices In an embodiment, a method of pairing a first ear-worn device and a second ear-worn device uses the ear-worn device to detect a vibration sequence rather than the case to detect the vibration sequence. The first ear-worn device detects a first detected vibration sequence at an IMU or microphone of the first ear-worn device. The second ear-worn device simultaneously detects a second detected vibration sequence at an IMU or microphone of the second ear-worn device. Then, the first ear-worn device compares the first detected vibration sequence to an expected vibration sequence and the second ear-worn device compares the second detected vibration sequence to the expected vibration sequence. The ear-worn devices then decide whether to pair the wireless communication device of the first ear-worn device to the wireless communication device of the second ear-worn device based on the comparison.

Many different methods are contemplated herein, including, but not limited to, methods of making, methods of using, and the like. Aspects of system/device operation described elsewhere herein can be performed as operations of one or more methods in accordance with various embodiments herein.

Charging Case Structure Detail and Options

Further options for the structure and function of the charging case 102 will now be described with reference to FIGS. 3-4, showing the charging case in an open position, and FIGS. 6-7 showing the charging case in a closed position. As shown by comparing the open configuration of FIGS. 3-4 with the closed configuration of FIG. 5-6, the first body portion 320 and second body portion 340 may move relative to one another, such as by rotating about the hinge pin 750 (FIG. 7). Each of the first body portion 320 and second body portion 340 may include an inner surface 322, 342. The inner surfaces 322, 342 may define a generally planar shape. The inner surfaces 322, 342 of the first and second body portions 320, 340, respectively, may face each other and, in various embodiments, may abut one another, when the case 102 is in the closed position. Additionally, the inner surfaces 322, 342 may be parallel with one another when the case 102 is in the closed position. In one or more embodiments, the case 102 may include one or more mirrors positioned on one or both of the inner surfaces 322, 342 such that the one or more mirrors are usable when the case 102 is in the open position. In various examples, the user may use the one or more mirrors to assist in donning the ear-worn devices. The inner surface 322 of the first body portion 320 may define a first cavity 325 extending into the first body portion 320 to receive a first ear-worn device. The inner surface 342 of the second body portion 340 may define a second cavity 345 extending into the second body portion 340 to receive a second ear-worn device.

When the case 102 is in the open position, ear-worn devices may be placed in or removed from each of the first and second body portions 320, 340, such as within the first and second cavities 325, 345, respectively. The ear-worn devices may include any type of ear-worn device as known by one of skill in the art. Further, the first and second cavities 325, 345 may be any suitable size and/or shape to receive any type of ear-worn device. In one or more embodiments, the case 102 may include an adapter to modify the cavities 325, 345 to receive a different sized ear-worn device. By positioning the ear-worn devices within the cavities 325, 345, the ear-worn devices may be protected from being damaged due to, for example, bending of a cable, twisting of a cable, other cable failure, damage to an ear-worn device case, or other damage.

When the ear-worn device is received by the corresponding cavity 325, 345, the ear-worn device is contained within the corresponding body portion 320, 340 such that the ear-worn device does not protrude beyond the inner surfaces 322, 342 of the first and second body portions 320, 340. Further, the cavities 325, 345 may be offset from one another such that when the case 102 is in the closed position, the cavities 325, 345 (and the ear-worn devices contained therein) minimally overlap one another or "nest" relative to one another. In one or more embodiments, the ear-worn devices may be removed from the cavities 325, 345 by pushing on an end portion of the ear-worn device, such as an end portion of the ear piece, such that the other end of the ear-worn device tips or pops up from the corresponding cavity 325, 345 such that the user can take out the ear-worn device.

In one or more embodiments, the first body portion 320 may include a charging contact 326 located within the first cavity 325 and the second body portion 340 may include a charging contact 446 located within the second cavity 345. The first and second charging contacts 326, 446 may be configured to interact with the ear-worn device positioned within the cavity 325, 345 to charge the ear-worn device. The charging contacts 326, 446 may include a biasing element, such as a spring, that aids in retaining the ear-worn device within the cavity 325, 345, such as by applying a force to the ear-worn devices to push them against the cavities 325, 345. Further, the shape of the cavities 325, 345 may automatically position the ear-worn device correctly within the cavities 325, 345 such that the ear-worn device is aligned with the charging contacts 326, 446. As a result, if the case 102 is moved to the closed position, the ear-worn devices will be correctly positioned to charge. Also, in various embodiments, no additional latches may be needed to retain the ear-worn devices within the cavities 325, 345.

In various embodiments, the biasing elements of the charging contacts 326, 446 may include magnets to align the charging contacts 326, 446 to the ear-worn device. For example, the magnets of the biasing elements may create a tactile sensation such that the ear-worn device snaps into place and contacts the charging contacts 326, 446. In some examples, the contact with the charging contacts 326, 446 happens without additional manipulation of the device by the user. Specifically, the corresponding magnets of the ear-worn device may be added in a planar fashion (e.g., instead of linear) as it relates to the axis of the magnet. Therefore, the sensation resulting from connecting the ear-worn device within the cavity (e.g., connecting the charging contacts 326, 446 to the ear-worn device) may provide a feeling of the ear-worn device jumping into place.

In one or more embodiments, one or both of the first and second body portions 320, 340 may include a retaining ledge (not shown) within the corresponding cavity 325, 345 to assist in retaining or keeping the ear-worn device within the cavity. The retaining ledge may provide an extension of the inner surface 322 such that the cavity 325 extends beneath the retaining ledge. Further, when the ear-worn device is positioned in the cavity 325, a user input device 512 (FIG. 5) of the ear-worn device may be restricted from movement due to the retaining ledge, for example, the retaining ledge may retain the ear-worn device in the nest of the cavity. Additionally, because the ear-worn device may be restrained proximate the side opposite the user input device 512, for example, due to magnets proximate the charging pins, any temporary deformity of the cable of the ear-worn device may be eliminated. For example, temporary deformity due to continual wear by the user may be removed and straightened out by time spent in the cavity 325 such that the ear-worn device may return to its desired flat shape. In other words, the retaining ledge may configure the ear-worn device in a position that is consistent with a relaxed state of the ear-worn device.

Further, each of the first and second body portions 320, 340 may include an outer surface opposing the inner surface 322, 342, respectively. A distance between the inner surfaces 322, 342 and the corresponding outer surfaces defines the depth of each of the first and second body portions 320, 340, respectively. The depth of each of the first and second body portions 320, 340 may be larger than the width of the ear-worn device contained within the first or second body portion 320, 340. In other words, each of the first and second body portions 320, 340 may be deep enough such that the ear-worn devices may be contained therein without protruding past the inner surface 322, 342. In some embodiments, the first and second body portions 320, 340 may define separate depths. However, as shown, the depths of the first and second body portions 320, 340 are equal. Specifically, the depths of the first and second body portions 320, 340, for example, measured between the inner surfaces 322, 342 and the outer surfaces are about greater than or equal to 0.1 inches (2.54 millimeters) and/or less than or equal to 1.5 inches (3.8 centimeters).

As shown in FIGS. 6 and 7, the outer surfaces 724, 644 of each of the first and second body portions 320, 340 may define an opening 740, 640 extending through the outer surfaces 724, 644 to the first and second cavities 325, 345, respectively. The openings 740, 640 are sized such that the ear-worn devices cannot pass through. In other words, the ear-worn devices cannot fall out of the case 102 through the openings 740, 640. Further, the openings 740, 640 provide a passageway through the outer surfaces 724, 644 such that debris may not become lodged within the cavities 325, 345 and, thereby, may reduce the need for user cleaning and maintenance of the cavities 325, 345. Further yet, the ear-worn devices may be visible to a user upon inspection of an exterior of the case 102 when in the closed position, thereby assuring the user that the ear-worn devices are positioned within the case 102 without having to open the case 102. Additionally, the openings 740, 640 may provide the user a way to push the ear-worn devices out of the cavities 325, 345 through the openings 740, 640 instead of pulling the ear-worn devices from proximate the inner surfaces 322, 342.

The first body portion 320 may define a top side 332, a hinge side 334, a bottom side 336, and a latch side 338. Similarly, the second body portion 340 may define a top side 352, a hinge side 354, a bottom side 356, and a latch side 358. It is noted that FIGS. 3 and 4 illustrate the top sides 332, 352, the hinge sides 334, 354, the bottom sides 336, 356, and the latch sides 338, 358 extending between the inner surfaces 322, 342 and the outer surfaces 724, 644, respectively. In some embodiments, the outer surfaces 724, 644 may be contoured to intersect the inner surfaces 322, 342 such that the top sides 332, 352, the hinge sides 334, 354, the bottom sides 336, 356, and the latch sides 338, 358 are effectively part of the outer surfaces 724, 644.

As shown in FIG. 7, the one or more hinges 360 may be coupled to each of the first and second body portions 320, 340 at the hinge sides 334, 354. On the latch sides 338, 358, the case may include a latch apparatus (not shown) for restricting the case 102 in the closed position. The latch apparatus may include any suitable components for restricting movement of the first body portion 320 relative to the second body portion 340 to maintain the case 102 in the closed position. For example, the latch apparatus may include a magnetic clasp/closure, a fastener, a mechanical clasp, a clasping element, a caring element, a spring latch, a toggle latch, a cam lock, a slam latch, etc. The latch apparatus may be positioned on one or both of the first and second body portions 320, 340 and may be adapted or configured to couple the first body portion 320 and the second body portion 340.

In various embodiments, the case 102 may include a solar element 720 as shown in FIG. 7. The solar element 720 may collect solar rays to charge the battery 302 located within the case 102. The solar element 720 may be located on any suitable portion of the case 102, for example, the first body portion 320, the second body portion 340, etc. For example, as shown in FIG. 7, the solar element 720 is located on the outer surface 724 of the first body portion 320.

In various embodiments, the case 102 may include an inductive charging element (not shown). The inductive charging element may be used to charge the battery 302 (e.g., using an inductive coil) located within the case 102. The inductive charging element may be located on any suitable portion of the case 102, for example, the first body portion 320, the second body portion 340, etc.

Additional examples of and details regarding a charging case for use with the systems and methods described herein are shown in commonly assigned, co-pending application U.S. PUB NO. 2019/0208342A1, titled, "HEARING DEVICE CASE INCLUDING CHARGER," having reference number ST0752US1, which is incorporated by reference herein in its entirety.

It should be noted that, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

As used herein, the recitation of numerical ranges by endpoints shall include all numbers subsumed within that range (e.g., 2 to 8 includes 2.1, 2.8, 5.3, 7, etc.).

The headings used herein are provided for consistency with suggestions under 37 CFR 1.77 or otherwise to provide organizational cues. These headings shall not be viewed to limit or characterize the invention(s) set out in any claims that may issue from this disclosure. As an example, although the headings refer to a "Field," such claims should not be limited by the language chosen under this heading to describe the so-called technical field. Further, a description of a technology in the "Background" is not an admission that technology is prior art to any invention(s) in this disclosure. Neither is the "Summary" to be considered as a characterization of the invention(s) set forth in issued claims.

The embodiments described herein are not intended to be exhaustive or to limit the invention to the precise forms disclosed in the following detailed description. Rather, the embodiments are chosen and described so that others skilled in the art can appreciate and understand the principles and practices. As such, aspects have been described with reference to various specific and preferred embodiments and techniques. However, it should be understood that many variations and modifications may be made while remaining within the spirit and scope herein.

The invention claimed is:

1. A hearing assistance system comprising:
a first ear-worn device and a second ear-worn device, wherein each of the ear-worn devices comprises:
   a speaker,
   a microphone,
   a processor,
   a non-transitory computer memory,
   a rechargeable battery,
   a charging contact, and
   a wireless communication device; and
a case comprising:
   a case battery,
   a case inertial measurement unit (IMU),
   a first case charging contact and a second case charging contact,
   a case processor, and
   a case non-transitory computer memory,
wherein the first ear-worn device is configured to be positioned within the case so that the charging contact of the first ear-worn device is in electrical communication with the first case charging contact within the case,
wherein the second ear-worn device is configured to be positioned within the case so that the charging contact of the second ear-worn device is in electrical communication with the second case charging contact within the case; and
wherein one or more of the memories in the first ear-worn device or the second ear-worn device stores computer instructions for instructing one or more of the processors in the first ear-worn device, second ear-worn device, or case to perform:
   while the first and second ear-worn devices are positioned within the case, detecting a vibration sequence at the case IMU; and
   deciding whether to pair the wireless communication devices of the first and second ear-worn devices based on the vibration sequence detected at the case IMU.

2. The system of claim 1, wherein:
the memory of the case storing instructions to input the vibration sequence detected at the case IMU to the processor of the first ear-worn device and to the processor of the second ear-worn device;
the memory of each of the ear-worn devices storing instructions to:
   compare the vibration sequence detected at the case IMU to an expected vibration sequence; and
   if the vibration sequence detected at the case IMU sufficiently matches the expected vibration sequence, pairing the wireless communication device of the first ear-worn device to the wireless communication device of the second ear-worn device.

3. The system of claim 2, the memory of each of the ear-worn devices storing instructions to receive the vibration sequence detected at the case IMU via the charging contact.

4. The system of claim 2, the memory of the case storing instructions to accept a user input vibration sequence to define the expected vibration sequence and communicate the expected vibration sequence to the memory of the ear-worn devices.

5. The system of claim 2, wherein one or more of the memories in the first ear-worn device, second ear-worn device, or case stores computer instructions for instructing one or more of the processors in the first ear-worn device, second ear-worn device, or case to perform:
   pairing the first and second ear-worn devices;
   after pairing the first and second ear-worn devices, lighting a positive indicator light on the case to indicate to a user that the first and second ear-worn devices are paired; and
   if the vibration sequence detected at the case IMU does not sufficiently match the expected vibration sequence, lighting a negative indicator light on the case to indicate to the user that the first and second ear-worn devices are not paired.

6. The system of claim 1, wherein the memory in the first ear-worn device and the memory in the second ear-worn device stores computer instructions to perform:
   while the ear-worn devices are positioned in the case, the ear-worn devices detecting an open/close sequence comprising making an electrical connection in response to closing the case and unmaking an electrical connection in response to opening the case, wherein the open/close sequence is detected at the charging contact of the first ear-worn device and the charging contact of the second ear-worn device; and
   in response to detecting the open/close sequence, the first and second ear-worn devices entering a pairing mode.

7. The system of claim 1, further comprising a smart phone comprising an IMU, a processor, a non-transitory computer memory, a user input device, a wireless communication device, and a display device, wherein the memory of the smart phone stores computer instructions for instructing the processor in the smart phone to perform:

placing the smart phone into a pairing mode;
at a same time as the vibration sequence is detected at the case IMU, detecting the vibration sequence by the smart phone IMU; and
based on the vibration sequence detected by the smart phone IMU, deciding whether to pair the wireless communication device of the smart phone with the wireless communication devices of the first and second ear-worn devices.

8. The system of claim 7, wherein the memory of the smart phone stores computer instructions for instructing the processor in the smart phone to perform:
inputting the vibration sequence detected at the smart phone IMU to the processor of the smart phone;
comparing the vibration sequence detected at the smart phone IMU to an expected vibration sequence; and
if the vibration sequence detected at the smart phone IMU sufficiently matches the expected vibration sequence, pairing the wireless communication device of the smart phone with the wireless communication devices of the first and second ear-worn devices.

9. The system of claim 8, wherein the memory of the smart phone stores computer instructions for instructing the processor in the smart phone to perform:
if the vibration sequence detected at the smart phone IMU does not sufficiently match the expected vibration sequence, presenting a message to a user on a display device of the smart phone indicating that the smart phone has not been paired to the first and second ear-worn devices.

10. The system of claim 1, wherein the case IMU is configured to detect a vibration sequence generated by:
placing the case on a hard surface, wherein the case is in a closed position and the first and second ear-worn devices are within the case; and
after placing the case on the hard surface, generating the vibration sequence by knocking on a hard surface with the case laying on the hard surface.

11. The system of claim 1, wherein the vibration sequence is generated by tapping the case on a hard surface, wherein the case is in a closed position and the first and second ear-worn devices are within the case.

12. A method of pairing a first ear-worn device and a second ear-worn device, wherein each of the ear-worn devices comprises:
a speaker,
a microphone,
a processor,
a non-transitory computer memory,
a rechargeable battery,
a charging contact, and
a wireless communication device,
wherein the first ear-worn device is configured to be positioned within a case so that the charging contact of the first ear-worn device is in electrical communication with a first case charging contact within the case,
wherein the second ear-worn device is configured to be positioned within the case so that the charging contact of the second ear-worn device is in electrical communication with a second case charging contact within the case,
wherein the case comprises:
a battery and
a case inertial measurement unit (IMU);
the method comprising:
with computer instructions stored in one or more of the memories in the first ear-worn device or second ear-worn device, instructing one or more of the processors in the first ear-worn device or second ear-worn device to perform the steps of:
while the first and second ear-worn devices are positioned within the case, detecting a vibration sequence at the case IMU after the first and second ear-worn devices enter a pairing mode; and
deciding whether to pair the wireless communication devices of the first and second ear-worn devices based on the vibration sequence detected at the case IMU.

13. The method of claim 12, further comprising:
inputting the vibration sequence detected at the case IMU to the processor of the first ear-worn device and to the processor of the second ear-worn device;
each of the ear-worn devices comparing the vibration sequence detected at the case IMU to an expected vibration sequence; and
if the vibration sequence detected at the case IMU sufficiently matches the expected vibration sequence, pairing the wireless communication device of the first ear-worn device to the wireless communication device of the second ear-worn device.

14. The method of claim 13, further comprising the memory of each of the ear-worn devices receiving the vibration sequence detected at the case IMU via the charging contact.

15. The method of claim 13, further comprising the memory of the case receiving a user input vibration sequence to define the expected vibration sequence and communicating the expected vibration sequence to the memory of the ear-worn devices.

16. The method of claim 13, further comprising:
after pairing the wireless communication devices of the first and second ear-worn devices, lighting a positive indicator light on the case to indicate to a user that the first and second ear-worn devices are paired; and
if the vibration sequence detected at the case IMU does not sufficiently match the expected vibration sequence, lighting a negative indicator light on the case to indicate to the user that the first and second ear-worn devices are not paired.

17. The method of claim 12, further comprising:
while the ear-worn devices are positioned in the case, the ear-worn devices detecting an open/close sequence comprising making an electrical connection in response to closing the case and unmaking an electrical connection in response to opening the case; and
in response to detecting the open/close sequence, the first and second ear-worn devices entering the pairing mode.

18. The method of claim 12, further comprising pairing the first and second ear-worn devices with a smart phone, comprising:
placing the smart phone into a pairing mode;
detecting the vibration sequence by a smart phone IMU at a same time as the vibration sequence is detected at the case IMU; and
based on the vibration sequence detected by the smart phone IMU, a processor of the smart phone deciding whether to pair a wireless communication device of the smart phone with the wireless communication devices of the first and second ear-worn devices.

19. The system of claim 6, wherein the open/close sequence comprises opening and closing the case three times.

20. A hearing assistance system comprising:
a first ear-worn device and a second ear-worn device, wherein each of the ear-worn devices comprises:
  a speaker,
  a microphone,
  a processor,
  a non-transitory computer memory,
  a rechargeable battery,
  a charging contact, and
  a wireless communication device; and
a case comprising:
  a case battery,
  a case inertial measurement unit (IMU),
  a first case charging contact and a second case charging contact,
  a case processor, and
  a case non-transitory computer memory,
wherein the first ear-worn device is configured to be positioned within the case so that the charging contact of the first ear-worn device is in electrical communication with the first case charging contact within the case,
wherein the second ear-worn device is configured to be positioned within the case so that the charging contact of the second ear-worn device is in electrical communication with the second case charging contact within the case; and
wherein one or more of the memories in the first ear-worn device, second ear-worn device, or case stores computer instructions for instructing one or more of the processors in the first ear-worn device, second ear-worn device, or case to perform:
  while the first and second ear-worn devices are positioned within the case, detecting a vibration sequence at the case IMU; and
deciding whether to pair the wireless communication devices of the first and second ear-worn devices based on the vibration sequence detected at the case IMU
wherein the memory in the first ear-worn device and the memory in the second ear-worn device stores computer instructions to perform:
  while the ear-worn devices are positioned in the case, the ear-worn devices detecting an open/close sequence comprising opening and closing the case at least two times and making an electrical connection in response to closing the case and unmaking an electrical connection in response to opening the case, wherein the open/close sequence is detected at the charging contact of the first ear-worn device and the charging contact of the second ear-worn device; and
  in response to detecting the open/close sequence, the first and second ear-worn devices entering a pairing mode.

* * * * *